United States Patent
Yang et al.

(10) Patent No.: US 9,060,360 B2
(45) Date of Patent: Jun. 16, 2015

(54) METHOD AND DEVICE FOR TRANSMITTING CONTROL INFORMATION

(75) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 13/811,891

(22) PCT Filed: Jul. 26, 2011

(86) PCT No.: PCT/KR2011/005498
§ 371 (c)(1),
(2), (4) Date: Jan. 23, 2013

(87) PCT Pub. No.: WO2012/015217
PCT Pub. Date: Feb. 2, 2012

(65) Prior Publication Data
US 2013/0121302 A1    May 16, 2013

Related U.S. Application Data

(60) Provisional application No. 61/367,861, filed on Jul. 26, 2010.

(51) Int. Cl.
*H04W 72/04* (2009.01)
*H04L 1/16* (2006.01)
(Continued)

(52) U.S. Cl.
CPC ......... *H04W 72/0413* (2013.01); *H04L 1/1692* (2013.01); *H04L 5/0053* (2013.01); *H04W 72/042* (2013.01); *H04L 1/0031* (2013.01); *H04L 1/1671* (2013.01); *H04L 5/001* (2013.01)

(58) Field of Classification Search
USPC .......................................................... 370/329
See application file for complete search history.

(56) References Cited

U.S. PATENT DOCUMENTS

2010/0098012 A1    4/2010 Bala et al.
2010/0173639 A1*   7/2010 Li et al. .......................... 455/450
(Continued)

FOREIGN PATENT DOCUMENTS

CN    101478379 A    7/2009
CN    101572591 A    11/2009
(Continued)

OTHER PUBLICATIONS

3GPP TS 36.213 version 9.2.0 Release 9 (Jun. 2010).*
(Continued)

*Primary Examiner* — Melvin Marcelo
*Assistant Examiner* — Peter Solinsky
(74) *Attorney, Agent, or Firm* — Birch, Stewart, Kolasch & Birch, LLP

(57) ABSTRACT

The present invention relates to a wireless communication system. More specifically, the present invention relates to a method and device for transmitting uplink control information when a plurality of cells are configured in a wireless communication system, the method comprising the steps of: generating a UCI; and determining a PUCCH resource for transmitting the UCI. If the reception response information and channel state information are triggered in the same subframe, only a first UCI generated from the reception response information is transmitted through a first PUCCH. If the reception response information and scheduling request information are triggered in the same subframe, a second UCI generated by jointly coding the reception response information and the scheduling request information is transmitted through a second PUCCH. The resource used for a reference signal for demodulating the first or second PUCCH is allocated in consideration of the UCI transmitted on PUCCH.

12 Claims, 20 Drawing Sheets

(51) Int. Cl.
*H04L 5/00* (2006.01)
*H04L 1/00* (2006.01)

(56) References Cited

U.S. PATENT DOCUMENTS

| | | | |
|---|---|---|---|
| 2010/0232382 A1* | 9/2010 | Gauvreau et al. | 370/329 |
| 2011/0205981 A1* | 8/2011 | Koo et al. | 370/329 |
| 2011/0218011 A1 | 9/2011 | Kim et al. | |
| 2011/0243066 A1* | 10/2011 | Nayeb Nazar et al. | 370/328 |
| 2012/0033643 A1 | 2/2012 | Noh et al. | |
| 2012/0051319 A1* | 3/2012 | Kwon et al. | 370/329 |
| 2012/0113831 A1* | 5/2012 | Pelletier et al. | 370/252 |
| 2013/0272244 A1* | 10/2013 | Cheng et al. | 370/329 |

FOREIGN PATENT DOCUMENTS

| | | |
|---|---|---|
| CN | 101777940 A | 7/2010 |
| CN | 2387268 A1 | 11/2011 |
| KR | 10-2010-0051530 A | 5/2010 |
| KR | 10-2010-0064334 A | 6/2010 |

OTHER PUBLICATIONS

3GPP TS 36.211 version 9.0.0 Release 9 (Jan. 2010).*

* cited by examiner

BPSK
PUCCH format 2a

QPSK
PUCCH format 2b

Reuse of LTE PUCCH format 2 structure (normal CP case)

*When SR transmission subframe and CSI transmissionsubframe are the same, CSI transmission is dropped in corresponding subframe.

* E-PUCCH resource for A/N transmission and
E-PUCCH resource for CSI transmission are shared.

*When SR transmission subframe and CSI transmission subframe are the same, CSI transmission is dropped in corresponding subframe.

*When SR transmission subframe and CSI transmission subframe are the same, CSI transmission is dropped in corresponding subframe.

METHOD AND DEVICE FOR TRANSMITTING CONTROL INFORMATION

CROSS-REFERENCE TO RELATED APPLICATIONS

This non-provisional application is a National Stage entry under U.S.C. §371 of International Application No. PCT/KR2011/005498 filed on Jul. 26, 2011, which claims priority under 35 U.S.C. 119(e) to U.S. Provisional Application No. 61/367,861 filed on Jul. 26, 2010, all of which are hereby expressly incorporated by reference into the present application.

TECHNICAL FIELD

The present invention relates to a wireless communication system, and more particularly, to a method and apparatus for transmitting control information.

BACKGROUND ART

Wireless communication systems are being widely deployed to provide various types of communication services such as voice or data. Generally, a wireless communication system is a multiple access system capable of supporting communication with multiple users by sharing available system resources (bandwidth, transmit power, etc.). The multiple access system includes, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DISCLOSURE

Technical Problem

An object of the present invention is to provide a method and apparatus for efficiently transmitting control information in a wireless communication system. Another object of the present invention is to provide a method and apparatus for efficiently piggybacking control information on data. Still another object of the present invention is to provide a method and apparatus for efficiently piggybacking control information on an uplink shared channel in a carrier aggregated situation.

It will be appreciated by persons skilled in the art that that the technical objects that can be achieved through the present invention are not limited to what has been particularly described hereinabove and other technical objects of the present invention will be more clearly understood from the following detailed description.

Technical Solutions

In an aspect of the present invention, a method for transmitting Uplink Control Information (UCI) in a situation in which a plurality of cells is configured in a wireless communication system includes generating UCI; and determining a Physical Uplink Control Channel (PUCCH) resource for transmitting the UCI, wherein, if reception response information and channel state information are triggered in the same subframe, only first UCI generated from the reception response information is transmitted through a first PUCCH, and if the reception response information and scheduling request information are triggered in the same subframe, second UCI generated by joint coding the reception response information and the scheduling request information is transmitted through a second PUCCH, and wherein a resource used to transmit a reference signal for demodulation of the first PUCCH or the second PUCCH is provided in consideration of UCI transmitted on a PUCCH.

In another aspect of the present invention, a communication apparatus for transmitting Uplink Control Information (UCI) in a situation in which a plurality of cells is configured in a wireless communication system includes a Radio Frequency (RF) unit; and a processor, wherein the processor is configured to generate UCI and to determine a Physical Uplink Control Channel (PUCCH) resource for transmitting the UCI, wherein, if reception response information and channel state information are triggered in the same subframe, only first UCI generated from the reception response information is transmitted through a first PUCCH and, if the reception response information and scheduling request information are triggered in the same subframe, second UCI generated by joint coding the reception response information and the scheduling request information is transmitted through a second PUCCH, and wherein a resource used to transmit a reference signal for demodulation of the first PUCCH or the second PUCCH is provided in consideration of UCI transmitted on a PUCCH.

A PUCCH resource for the first PUCCH may be shared with a PUCCH resource for the second PUCCH.

The resource used to transmit the reference signal include at least one of a Physical Resource Block (PRB), a Cyclic Shift (CS) applied to a reference signal sequence, and an orthogonal code applied to a plurality of Single Carrier Frequency Division Multiple Access (SC-FDMA) symbols in a time domain.

The orthogonal code applied to the plurality of SC-FDMA symbols in the time domain may be provided in consideration of the UCI transmitted on the PUCCH.

The resource used to transmit the reference signal for demodulation of the first PUCCH may correspond to the reception response information and the resource used to transmit the reference signal for demodulation of the second PUCCH may correspond to the scheduling request information.

The reception response information may include Acknowledgement/Negative (ACK/NACK) responses to Physical Downlink Shared Channels (PDSCHs) of a plurality of cells.

Advantageous Effects

According to embodiments of the present invention, control information can be efficiently transmitted in a wireless communication system. In addition, control information can be efficiently piggybacked on data. Furthermore, control information can be efficiently piggybacked on an uplink shared channel in a carrier aggregated situation.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

The following technology may be used in various wireless access systems, such as CDMA, FDMA, TDMA, OFDMA and SC-FDMA systems. CDMA may be implemented with wireless technology such as Universal Terrestrial Radio Access (UTRA) or CDMA2000. TDMA may be implemented with wireless technology such as Global System for Mobile communications (GSM)/General Packet Radio Service (GPRS)/Enhanced Data Rates for GSM Evolution (EDGE). OFDMA may be implemented with wireless technology such as IEEE 802.11 (Wi-Fi), IEEE 802.16 (WiMAX), IEEE 802.20, and Evolved UTRA (E-UTRA). UTRA is part of a Universal Mobile Telecommunications System (UMTS). 3rd Generation Partnership Project (3GPP) Long Term Evolution (LTE) is a part of an Evolved UMTS (E-UMTS), which uses E-UTRA. LTE-Advanced (LTE-A) is an evolved version of 3GPP LTE.

The following embodiments of the present invention mainly describe 3GPP LTE/LTE-A in order to clarify the description. However, technical spirits of the present invention are not limited to the embodiments of the present invention described herein. Specific terms disclosed in the following description are provided to aid in understanding the present invention, and the use of these specific terms may be changed to another format within the technical scope or spirit of the present invention.

Figure 1:
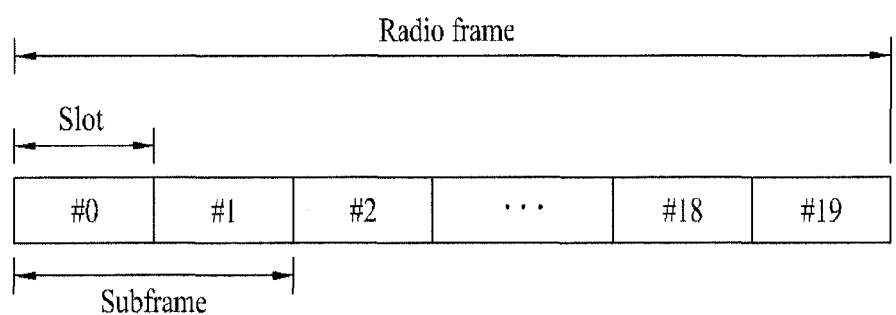
FIG. 1 illustrates the structure of a radio frame.

FIG. 1 illustrates the structure of a radio frame.

Referring to FIG. 1, the radio frame includes 10 subframes, and one subframe includes two slots in the time domain. A time required to transmit one subframe is defined as a Transmission Time Interval (TTI). For example, one subframe may have a length of 1 ms and one slot may have a length of 0.5 ms. One slot may include a plurality of OFDM symbols or Single Carrier Frequency Division Multiple Access (SC-FDMA) symbols in the time domain. Since an LTE system uses OFDMA in downlink (DL) and SC-FDMA in uplink (UL), the OFDM or SC-FDMA symbol indicates one symbol duration. A Resource Block (RB) is a resource allocation unit and includes a plurality of contiguous subcarriers in one slot. The structure of the radio frame is only exemplary. The number of subframes included in a radio frame, the number of slots included in a subframe, or the number of symbols included in a slot may be changed in various manners.

Figure 2:
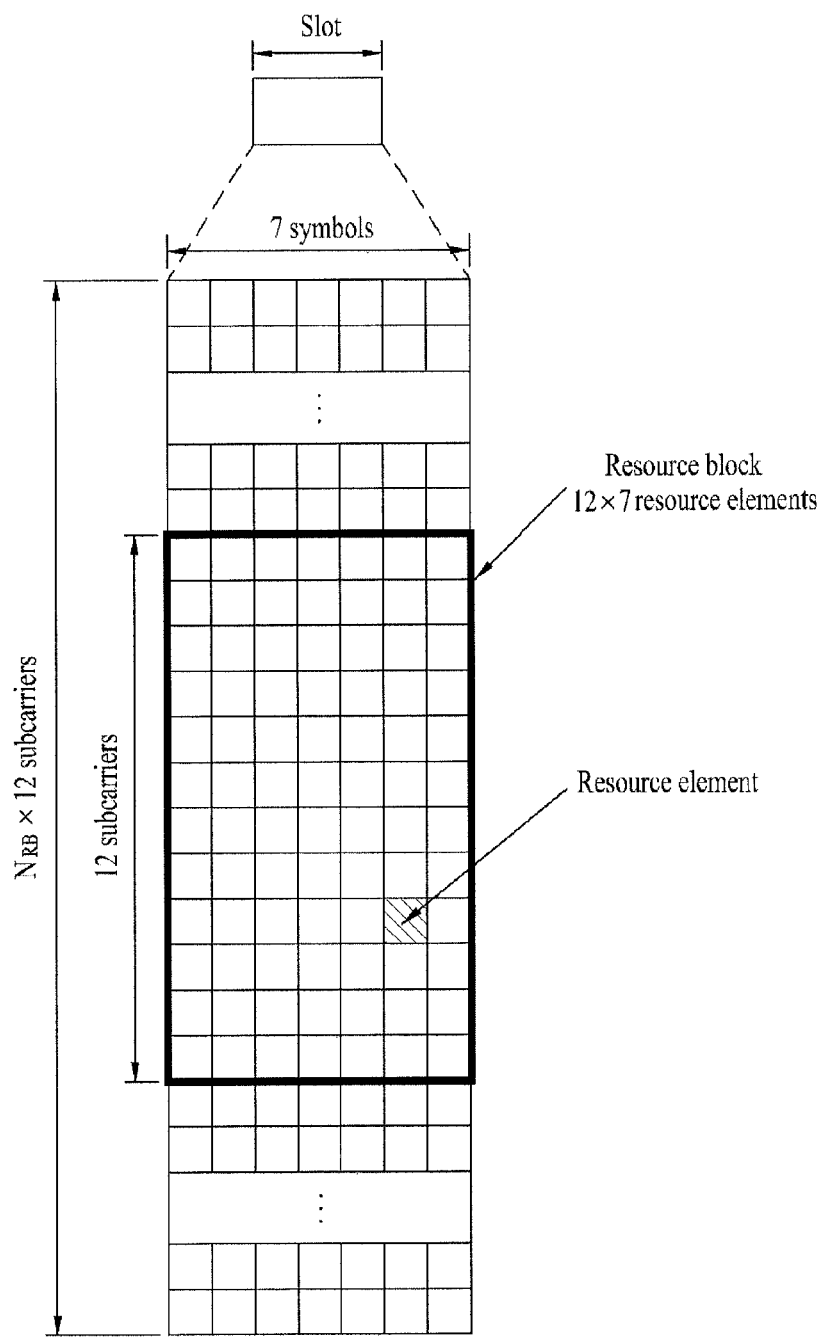
FIG. 2 illustrates a resource grid of a downlink slot.

FIG. 2 illustrates a resource grid of a DL slot.

Referring to FIG. 2, the DL slot includes a plurality of OFDM symbols in the time domain. One DL slot includes 7 (or 6) OFDM symbols and an RB may include 12 subcarriers in the frequency domain. Each element on the resource grid is referred to as a Resource Element (RE). One RB includes 12×7(or 6) REs. The number of RBs, $N_{RB}$, included in the DL slot depends on a DL transmission band. The structure of a UL slot is the same as the structure of the DL slot except that OFDM symbols are replaced with SC-FDMA symbols.

Figure 3:
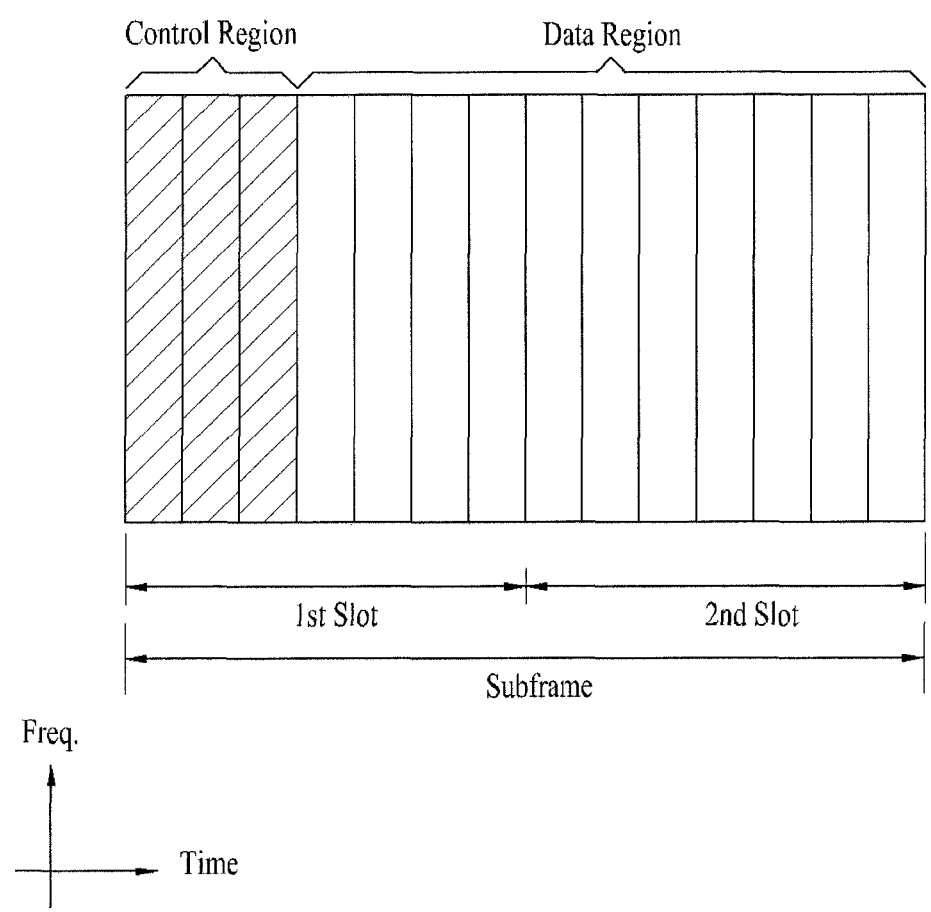
FIG. 3 illustrates the structure of a downlink subframe.

FIG. 3 illustrates the structure of a DL subframe.

Referring to FIG. 3, a maximum of 3 (or 4) OFDM symbols at the front part of a first slot of a subframe corresponds to a control region to which control channels are allocated. The remaining OFDM symbols correspond to a data region to which a Physical Downlink Shared Channel (PDSCH) is allocated. Examples of DL control channels used in the LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted in the first OFDM symbol of a subframe and carries information about the number of OFDM symbols used for transmission of control channels in the subframe. The PHICH carries a Hybrid Automatic Repeat request (HARQ) Acknowledgment/Negative-Acknowledgment (ACK/NACK) signal as a response to UL transmission.

Control information transmitted through the PDCCH is referred to as Downlink Control Information (DCI). The DCI includes resource allocation information for a User Equipment (UE) or a UE group and other control information. For example, the DCI includes UL/DL scheduling information, a UL transmit (Tx) power control command, etc.

The PDCCH carries a transmission format and resource allocation information for a Downlink Shared Channel (DL-SCH), a transmission format and resource allocation information for an Uplink Shared Channel (UL-SCH), paging information on a Paging Channel (PCH), system information on the DL-SCH, resource allocation information of a higher-layer control message such as a random access response transmitted on the PDSCH, a Tx power control command set for individual UEs in a UE group, a Tx power control command, activation indication information of Voice over IP (VoIP), and the like. A plurality of PDCCHs may be transmitted in the control region. A UE may monitor a plurality of PDCCHs. The PDCCH is transmitted on an aggregate of one or plural contiguous Control Channel Elements (CCEs). A CCE is a logical allocation unit used to provide the PDCCH with a coding rate based on a radio channel state. The CCE corresponds to a plurality of Resource Element Groups (REGs). A format of the PDCCH and the number of bits of the PDCCH are determined according to the number of CCEs. A Base Station (BS) determines a PDCCH format according to DCI to be transmitted to a UE and attaches a Cyclic Redundancy Check (CRC) to control information. An identifier (e.g. Radio Network Temporary Identifier (RNTI)) is masked to the CRC according to the owner or purposes of the PDCCH. For example, if the PDCCH is dedicated to a specific UE, an identifier of the UE (e.g. cell-RNTI (C-RNTI)) may be masked to the CRC. If the PDCCH is dedicated to a paging message, a paging identifier (e.g. paging-RNTI (P-RNTI))

may be masked to the CRC. If the PDCCH is for system information (more specifically, a System Information Block (SIB)), a System Information RNTI (SI-RNTI) may be masked to the CRC. If the PDCCH is for a random access response, a Random Access RNTI (RA-RNTI) may be masked to the CRC.

Figure 4:
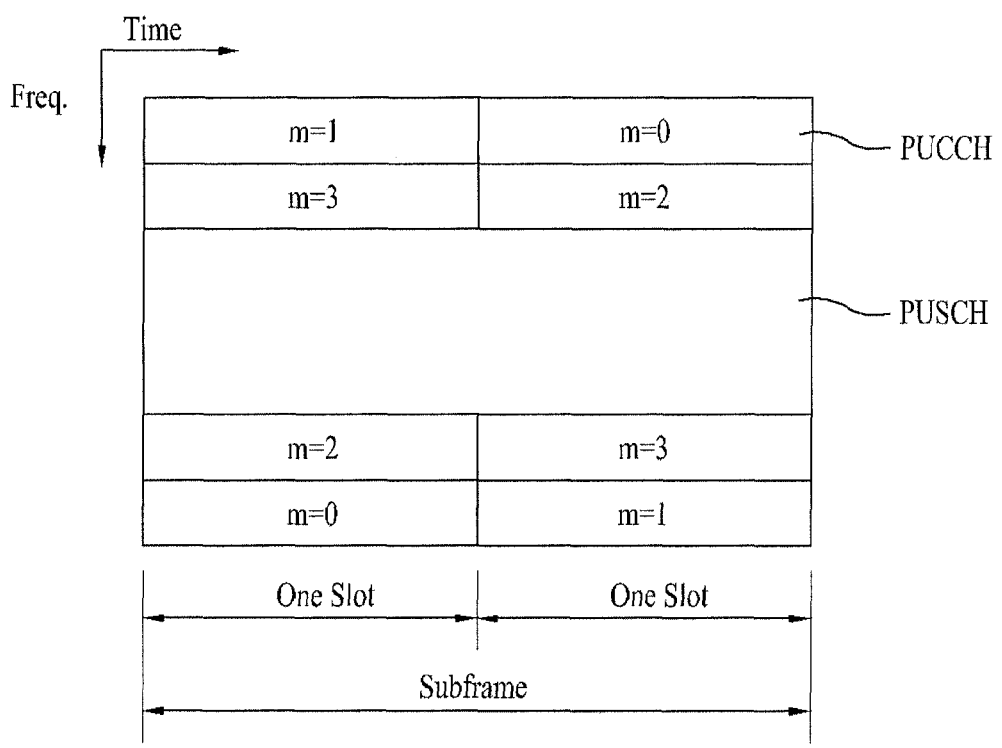
FIG. 4 illustrates the structure of an uplink subframe.

FIG. 4 illustrates the structure of a UL subframe used in an LTE system.

Referring to FIG. 4, a UL subframe includes plural (e.g. two) slots. Each slot may include a different number of SC-FDMA symbols according to the length of a Cyclic Prefix (CP). The UL subframe is divided into a data region and a control region in the frequency domain. The data region includes a PUSCH and is used to transmit data signals such as voice signals. The control region includes a PUCCH and is used to transmit Uplink Control Information (UCI). The PUCCH includes an RB pair located at both ends of the data region in the frequency domain and is hopped using the slot as a boundary.

The PUCCH may be used to transmit the following control information.

Scheduling Request (SR): used for requesting UL-SCH resources and transmitted using an On-Off Keying (OOK) scheme.

HARQ ACK/NACK: a response signal to a DL data packet on a PDSCH and indicates whether or not a DL data packet has been successfully received. 1-bit ACK/NACK is transmitted as a response to a single DL codeword, and 2-bit ACK/NACK is transmitted as a response to two DL codewords.

Channel Quality Indicator (CQI): feedback information for a DL channel. Multiple Input Multiple Output (MIMO)-associated feedback information includes a Rank Indicator (RI), a Precoding Matrix Indicator (PMI), a Precoding Type Indicator (PTI), etc. 20 bits are used per subframe.

The amount of UCI that can be transmitted in a subframe by a UE is dependent upon the number of SC-FDMA symbols available for UCI transmission. The SC-FDMA symbols available for UCI transmission indicate the remaining SC-FDMA symbols other than SC-FDMA symbols that are used for reference signal transmission in a subframe. In the case of a subframe in which a Sounding Reference Signal (SRS) is configured, the last SC-FDMA symbol of the subframe is also excluded. The reference signal is used for coherent detection of a PUCCH. The PUCCH supports 7 formats according to transmission information.

Table 1 shows the mapping relationship between PUCCH and UCI for use in LTE.

TABLE 1

| PUCCH Format | Uplink Control Information (UCI) |
| --- | --- |
| Format 1 | SR(Scheduling Request) (unmodulated waveform) |
| Format 1a | 1-bit HARQ ACK/NACK (with/without SR) |
| Format 1b | 2-bit HARQ ACK/NACK (with/without SR) |
| Format 2 | CQI (20 coded bits) |
| Format 2 | CQI and 1- or 2-bit HARQ ACK/NACK (20 bits) (for extended CP only) |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
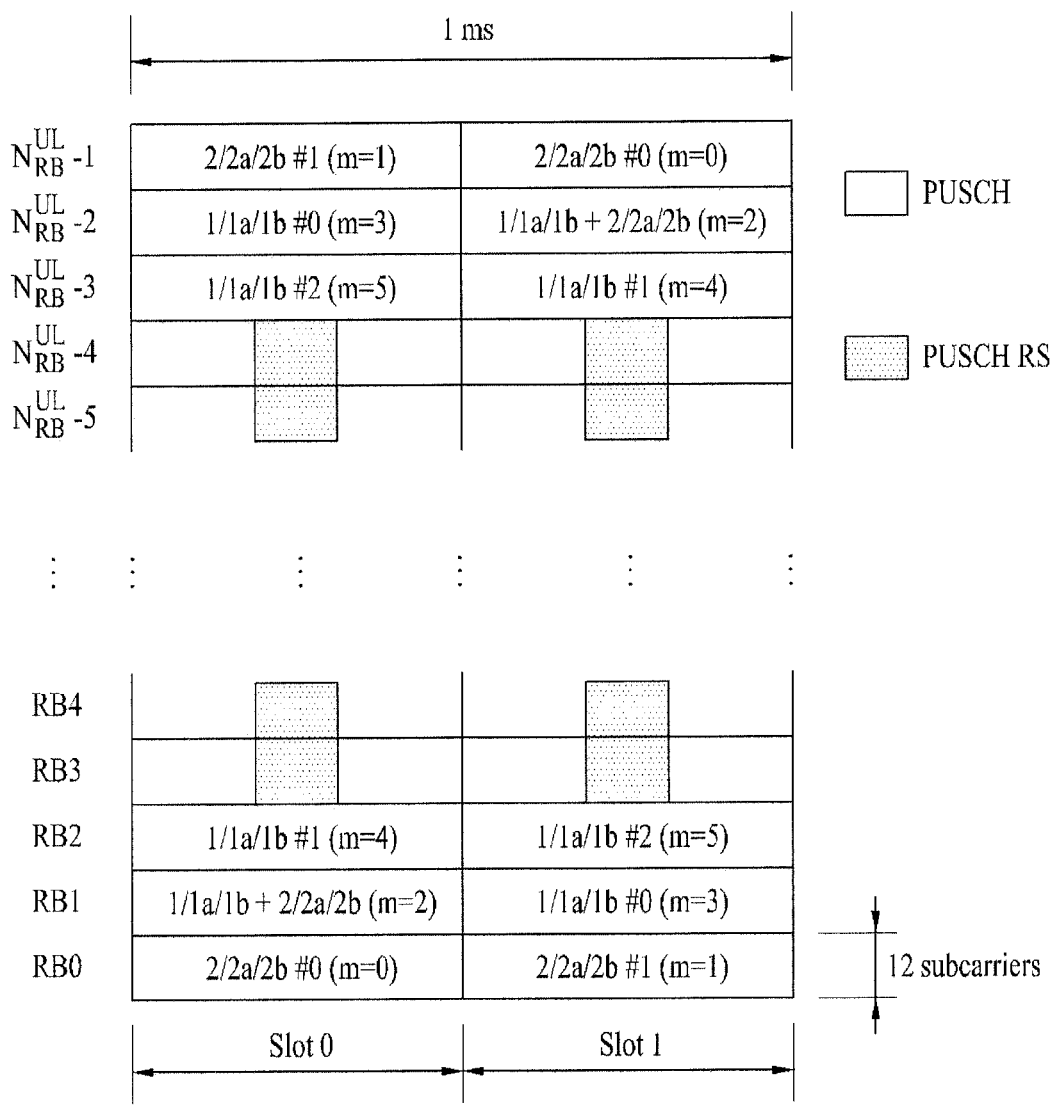
FIG. 5 illustrates physical mapping of PUCCH formats to PUCCH regions.

FIG. 5 illustrates physical mapping of PUCCH formats to PUCCH regions.

Referring to FIG. 5, PUCCH formats are mapped beginning from band edges on RBs in order of PUCCH format 2/2a/2b (CQI) (e.g. PUCCH region m=0, 1), a mixed format of PUCCH format 2/2a/2b (CQI) and PUCCH format 1/1a/1b (SR/HARQ ACK/NACK) (e.g. if present, PUCCH region m=2), and PUCCH format 1/1a/1b (SR/HARQ ACK/NACK) (e.g. PUCCH region m=3, 4, 5) and then are transmitted. The number of PUCCH RBs available for use by PUCCH format 2/2a/2b (CQI), $N_{RB}^{(2)}$, is transmitted to the UEs in the cell through broadcast signaling.

Figure 6:
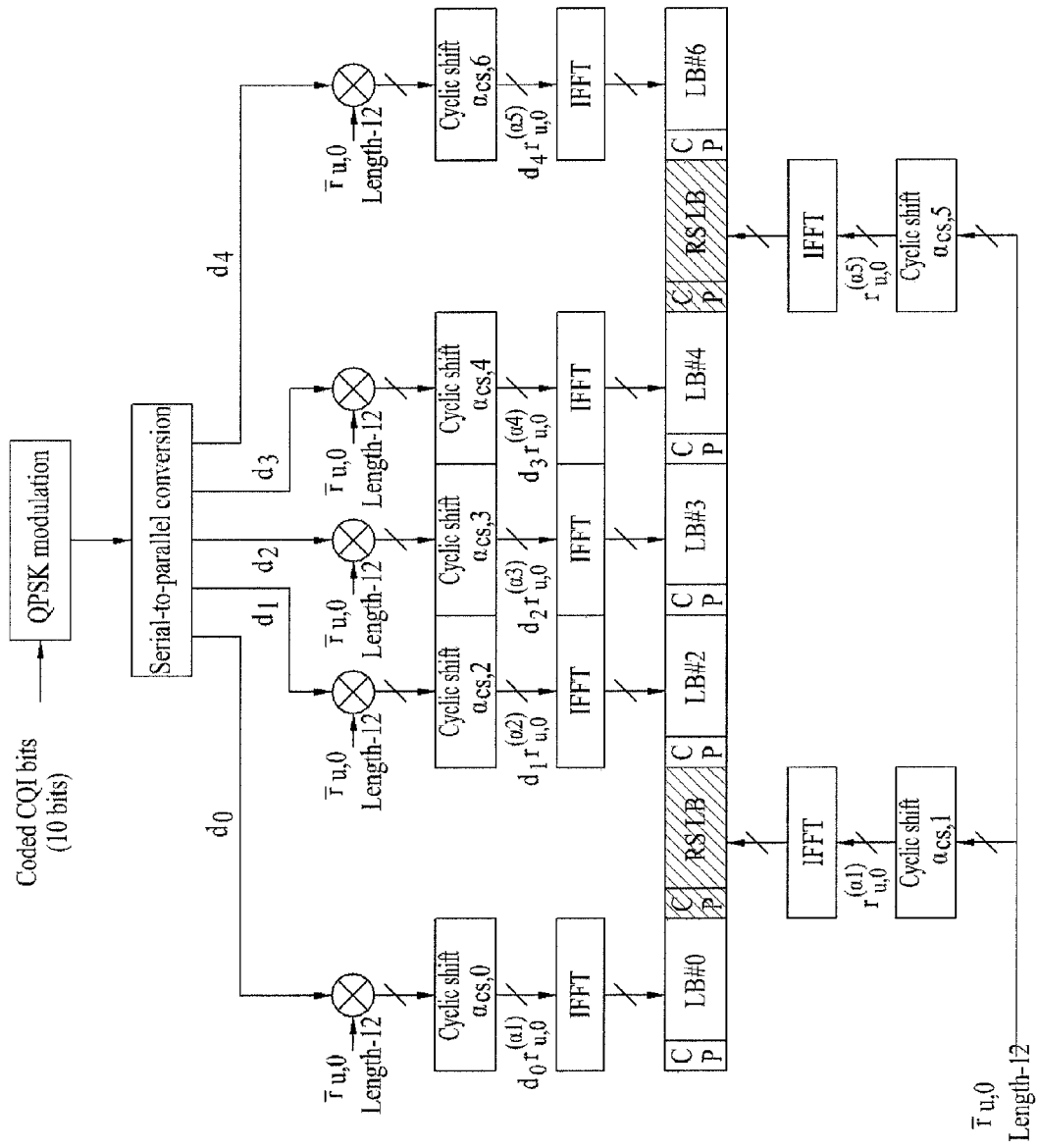
FIG. 6 illustrates a slot level structure of PUCCH format 2/2a/2b.

FIG. 6 illustrates a slot level structure of PUCCH format 2/2a/2b. The PUCCH format 2/2a/2b is used for Channel State Information (CSI) transmission. The CSI includes CQI, PMI, RI, PTI, etc. SC-FDMA symbols #1 and #5 are used for Demodulation Reference Signal (DM RS) transmission in a slot in the case of normal CP. In the case of extended CP, only SC-FDMA symbol #3 is used for DM RS transmission in the slot.

Referring to FIG. 6, 10 CSI bits are channel coded with a rate ½ punctured (20, k) Reed-Muller code in a subframe level to give 20 coded bits (not shown), which are then scrambled (not shown) and undergo Quadrature Phase Shift Keying (QPSK) constellation mapping (QPSK modulation). The coded bits may be scrambled in a similar way to PUSCH data with a length-31 Gold sequence. 10 QPSK modulated symbols are generated and 5 QPSK modulated symbols d0 to d4 are transmitted in each slot through corresponding SC-FDMA symbols. Each QPSK modulated symbol is used to modulate a base RS sequence ($r_{u,\,0}$) of length-12 prior to Inverse Fast Fourier Transform (IFFT). Consequently, the RS sequences are cyclic shifted ($d_x * r_{u,o}^{(\alpha x)}$, x=0 to 4) according to QPSK modulated symbol values in the time domain. The RS sequences multiplied by the QPSK modulated symbol values are cyclic shifted ($\alpha_{cs}$,x, x=1, 5). When the number of cyclic shifts is N, N UEs can be multiplexed on the same CSI PUCCH RB. The DM RS sequence is similar to a CSI sequence in the frequency domain but is not modulated by a CSI modulation symbol.

Parameters/resources for periodic CSI reporting are semi-statically configured by higher layer signaling. For example, if PUCCH resource index $n_{PUCCH}^{(2)}$ is set for CSI transmission, the CSI is periodically transmitted on the CSI PUCCH linked to the PUCCH resource index $n_{PUCCH}^{(2)}$. The PUCCH resource index $n_{PUCCH}^{(2)}$ indicates a PUCCH RB and a cyclic shift $\alpha_{cs}$.

Figure 7:
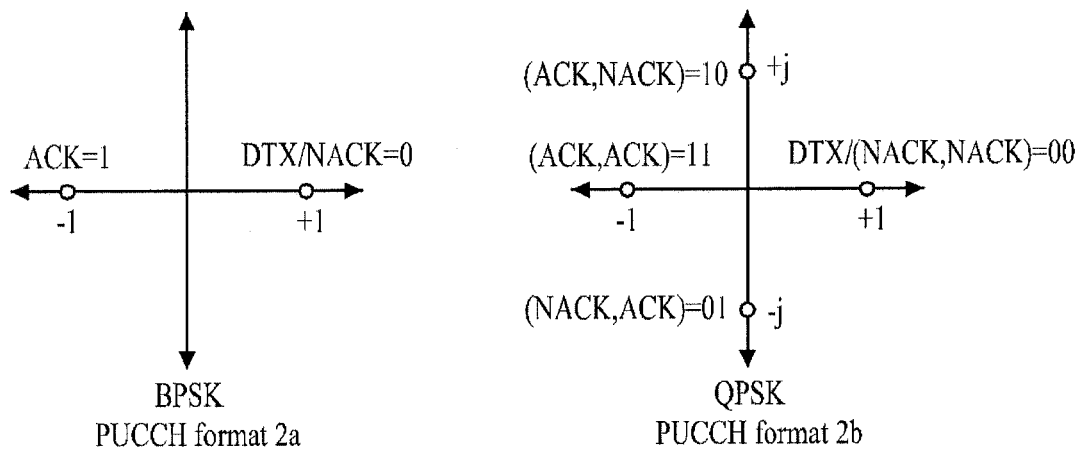
FIGS. 7 and 8 illustrate multiplexing of ACK/NACK and CQI by a UE.
Figure 8:
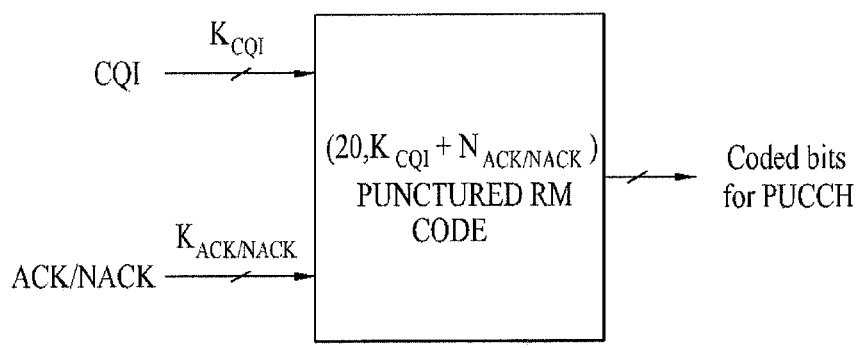

FIGS. 7 and 8 illustrate multiplexing of ACK/NACK and CQI by a UE.

In LTE, simultaneous transmission of ACK/NACK and CQI by a UE is enabled by UE-specific higher layer signaling. In the case where simultaneous transmission is not enabled and the UE needs to transmit ACK/NACK on the PUCCH in a subframe in which a CQI report has been configured, the CQI is dropped and only ACK/NACK is transmitted using PUCCH format 1a/1b. In a subframe in which a BS allows a UE to perform simultaneous transmission of ACK/NACK and CQI, CQI and 1- or 2-bit ACK/NACK information are multiplexed in the same PUCCH RB. The above method is differently implemented according to normal CP or extended CP.

In the normal CP, the UE BPSK/QPSK modulates (unscrambled) ACK/NACK bits as illustrated in FIG. 7 to transmit 1- or 2-bit ACK/NACK and CQI together (format 2a/2b). Accordingly, one ACK/NACK modulation symbol $d_{HARQ}$ is generated. ACK is coded as a binary value '1' and NACK is coded as a binary value '0'. The single ACK/NACK modulation symbol $d_{HARQ}$ is used to modulate the second RS (i.e. SC-FDMA symbol #5) in each slot. Namely, ACK/NACK is signaled using an RS for PUCCH format 2a/2b. CQI is carried on a UCI data part of PUCCH formats 2a/2b. FIG. 7 illustrates modulation mapping of NACK (or NACK, NACK in the case of two MIMO codewords) to +1 (no RS modulation). Discontinuous Transmission (DTX) is processed as NACK.

In the extended CP (one RS symbol per slot), 1- or 2-bit HARA ACK/NACK is joint coded with CQI. As a result, a $(20, k_{CQI}+k_{A/N})$ Reed-Muller based block code is generated. A 20-bit codeword is transmitted on the PUCCH using the CQI channel structure of FIG. 6. Joint coding of ACK/NACK and CQI is performed as illustrated in FIG. 8. The number of the largest bits of information supported by a block code is 13. In DL transmission, two codewords correspond to $k_{CQI}=11$ CQI bits and $k_{A/N}=2$ bits.

Figure 9:
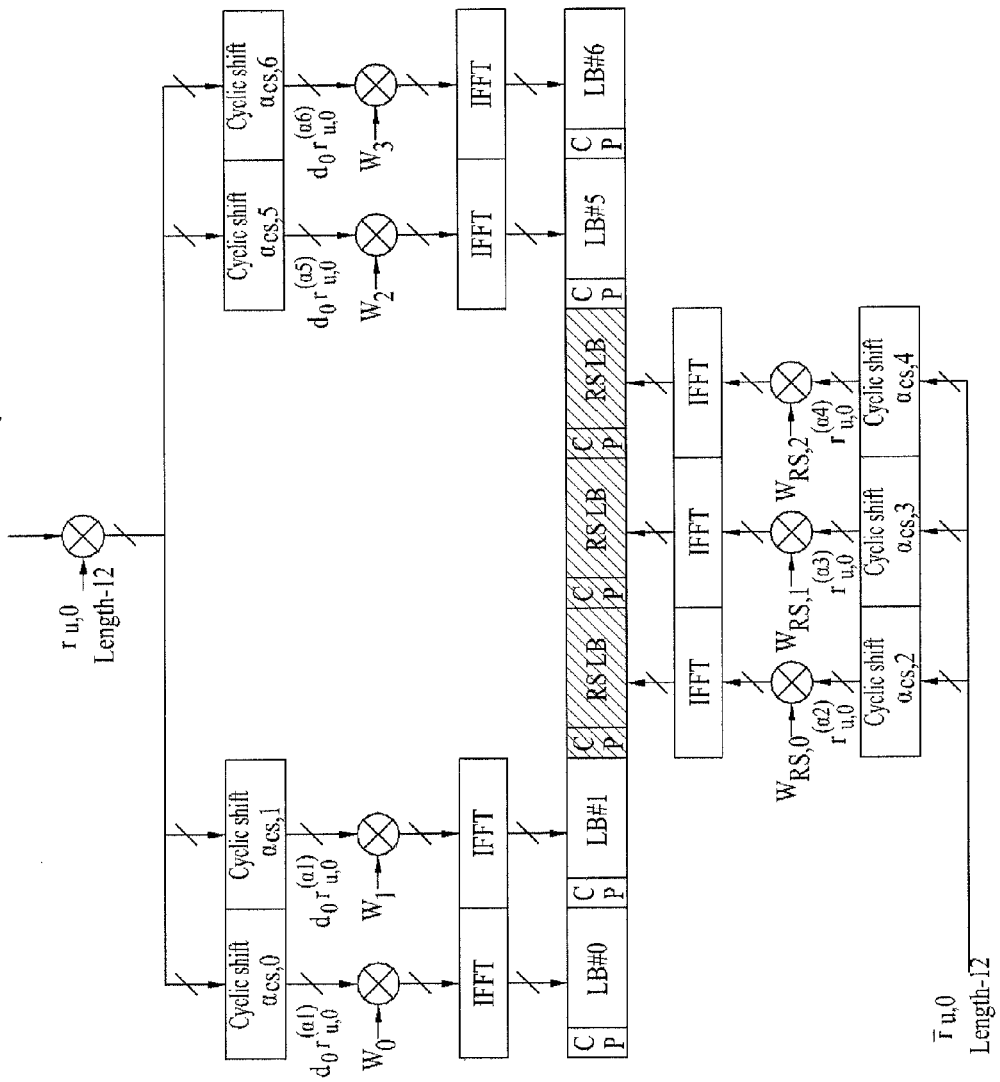
FIG. 9 illustrates a slot level structure of PUCCH format 1a/1b.

FIG. 9 illustrates a slot level structure of PUCCH format 1a/1b. The PUCCH format 1a/1b is used for ACK/NACK transmission. SC-FDMA symbols #2, #3, and #4 are used for DM RS transmission in the case of normal CP. In the case of extended CP, SC-FDMA symbols #2 and #3 are used for DM RS transmission. Accordingly, four SC-FDMA symbols are used for ACK/NACK transmission in one slot.

Referring to FIG. 9, 1-bit ACK/NACK information and 2-bit ACK/NACK information are modulated using BPSK and QPSK modulation schemes, respectively, resulting in a single ACK/NACK modulation symbol $d_0$. ACK/NACK information is given as 1 for a positive ACK and as 0 for a negative ACK (HACK). In addition to the cyclic shift $\alpha_{cs,x}$ in the frequency domain as in the CQI case above, the PUCCH format 1a/1b perform time domain spreading using orthogonal spreading codes (e.g. Walsh-Hadamard or DFT codes) w0, w1, w2 and w3. Since code multiplexing is used in both the frequency and time domains in the case of the PUCCH format 1a/1b, a large number of UEs can be multiplexed on the same PUCCH RB.

RSs transmitted from different UEs are multiplexed in the same way as UCI. The number of cyclic shifts supported in an SC-FDMA symbol for PUCCH ACK/NACK RBs may be configured by a cell-specific high layer signaling parameter $\Delta_{shift}^{PUCCH}$. $\Delta_{shift}^{PUCCH} \in \{1, 2, 3\}$ indicates 12, 6, and 4 shifts, respectively. In time-domain CDM, the number of spreading codes for ACK/NACK is limited by the number of RS symbols, because the multiplexing capacity of RS symbols is smaller than that of UCI symbols due to a smaller number of RS symbols.

Figure 10:
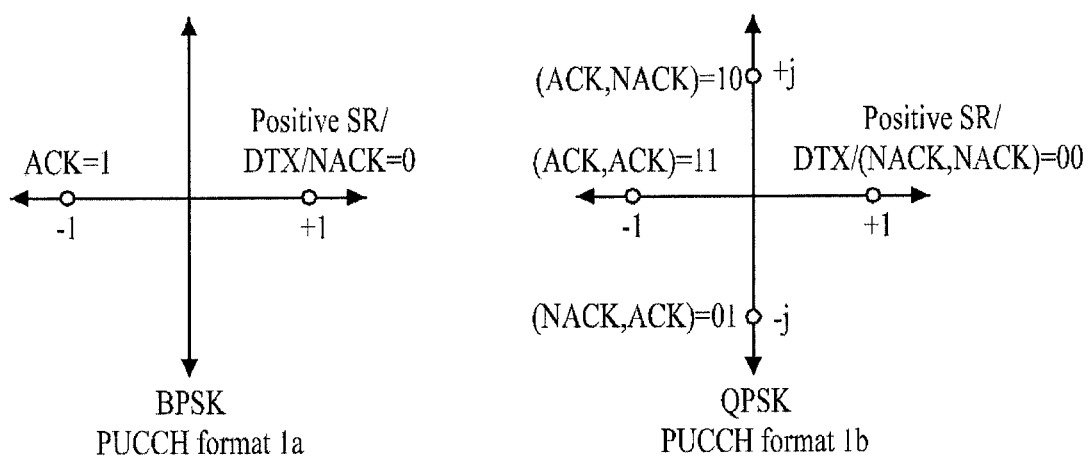
FIG. 10 illustrates multiplexing of ACK/NACK and SR by a UE.

FIG. 10 illustrates multiplexing of ACK/NACK and SR by a UE.

The structure of SR PUCCH format 1 is the same as that of ACK/NACK PUCCH format 1a/1b shown in FIG. 9. SR uses on-off keying. Specifically, the UE transmits SR having a modulation symbol d(0)=1 to request a PUSCH resource (positive SR transmission) and transmits nothing when scheduling is not requested (negative SR). Since a PUCCH structure for ACK/NACK is reused for SR, different PUCCH resource indexes (different cyclic time shifts/orthogonal code combinations) in the same PUCCH region may be assigned for SR (format 1) or HARQ ACK/NACK (format 1a/1b). A PUCCH resource index $m_{PUCCH,SRI}^{(1)}$ to be used by the UE for SR transmission is configured by UE-specific higher-layer signaling.

If the UE needs to transmit a positive SR in a subframe in which CQI transmission is scheduled, CQI is dropped and only the SR is transmitted. Similarly, if the UE needs to simultaneously transmit SR and SRS, CQI is dropped and only the SR is transmitted. If SR and ACK/NACK are generated in the same subframe, the UE transmits ACK/NACK on an SR PUCCH resource assigned for the positive SR. In the case of a negative SR, the UE transmits ACK/NACK on an assigned ACK/NACK PUCCH resource. FIG. 10 illustrates constellation mapping for simultaneous transmission of ACK/NACK and SR. Specifically, FIG. 10 illustrates modulation mapping of NACK (or NACK, NACK in the case of two MIMO codewords) to +1. When DTX is generated, it is processed as NACK.

Figure 11:
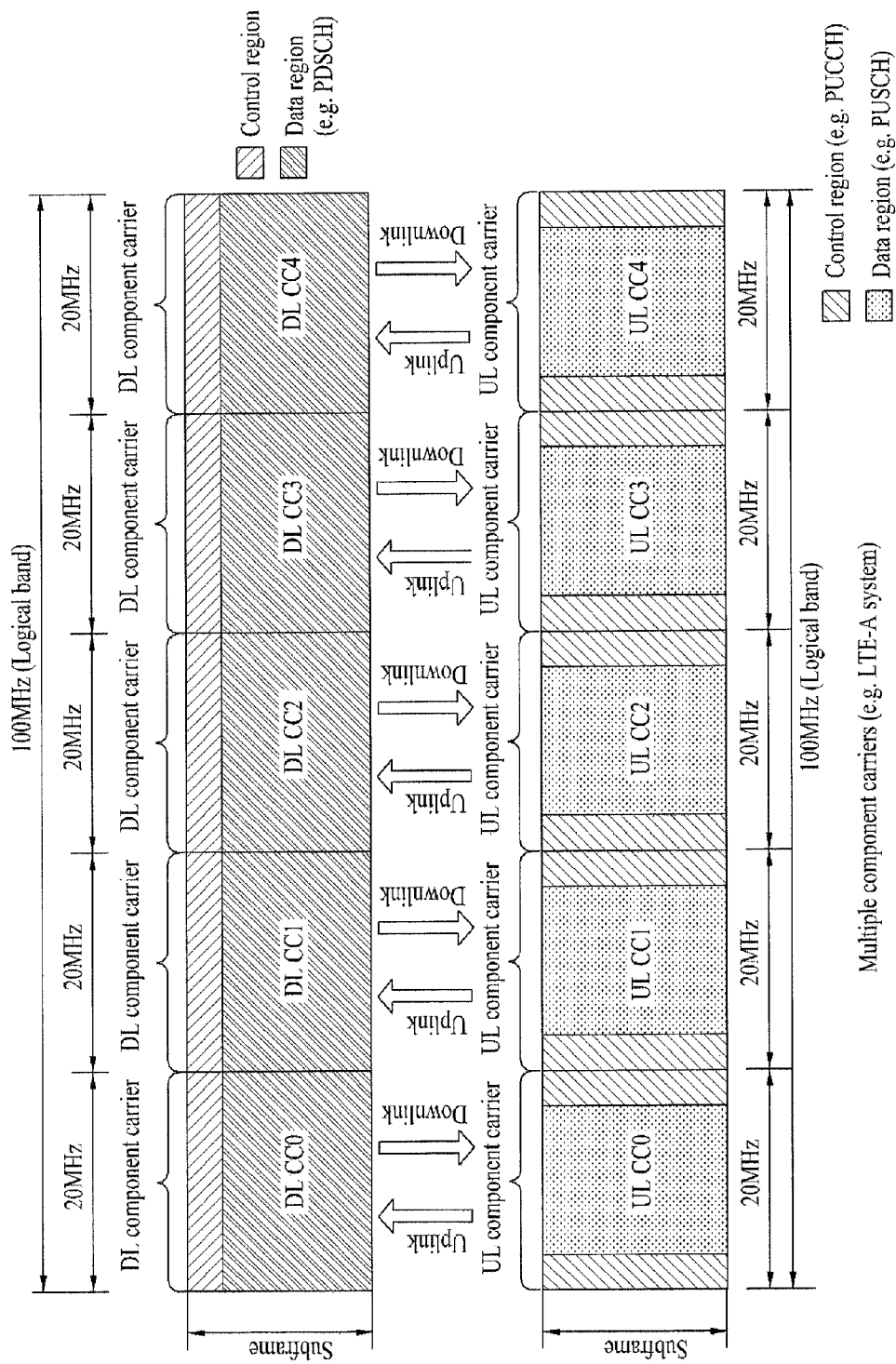
FIG. 11 illustrates a Carrier Aggregation (CA) communication system.

FIG. 11 illustrates a Carrier Aggregation (CA) communication system. An LTE-A system uses carrier aggregation or bandwidth aggregation that uses a wider UL/DL bandwidth by aggregating a plurality of UL/DL frequency blocks for a wider frequency band. Each frequency block is transmitted using a Component Carrier (CC). The CC may be understood as a carrier frequency (or center carrier, center frequency) for the corresponding frequency block.

Referring to FIG. 11, a wider UL/DL bandwidth can be supported by aggregating a plurality of UL/DL CCs. The CCs may be contiguous or noncontiguous in the frequency domain. The bandwidths of the CCs may be independently determined. Asymmetric carrier aggregation in which the number of UL CCs differs from the number of DL CCs may be used. In the case of two DL CCs and one UL CC, for example, they may be configured such that the ratio of DL CCs to UL CCs is 2:1. The DL CC/UL CC link may be fixed to the system or semi-statically configured. Furthermore, even if the entire system bandwidth is configured with N CCs, a frequency band that a specific UE can monitor/receive may be limited to M (<N) CCs. Various parameters regarding carrier aggregation may be configured cell-specifically, UE group-specifically, or UE-specifically. Meanwhile, control information may be configured so as to be transmitted and received only through a specific CC. This specific CC may be designated as a Primary CC (PCC) (or anchor CC) and the other CCs may be designated as Secondary CCs (SCCs).

LTE-A uses the concept of cells to manage radio resources. The cell is defined as a combination of DL and UL resources. Here, the UL resource is not an essential component. Accordingly, the cell can be configured with the DL resource alone, or with both the DL resource and UL resource. When carrier aggregation is supported, linkage between a DL resource carrier frequency (or DL CC) and a UL resource carrier frequency (or UL CC) may be indicated by system information. A cell that operates on the primary frequency (or PCC) may be designated as a primary cell (Pcell) and a cell that operates on the secondary frequency (or SCC) may be designated as a secondary cell (SCell). The PCell is used for the UE to perform an initial connection establishment or connection re-establishment procedure. PCell may represent a cell designated during a handover process. The SCell is configurable after RRC connection establishment and may be used to provide additional radio resources. The PCell and SCell may be commonly designated as a serving cell. Accordingly, for a UE that is in an RRC_CONNECTED state without carrier aggregation or does not support carrier aggregation, only one serving cell configured with only the PCell is presents. Meanwhile, for a UE in an RRC_CONNECTED state, for which carrier aggregation is configured, one or more serving cells including the PCell and SCell are present. For carrier aggregation, a network may configure one or more SCells for a UE that supports carrier aggregation in addition to the PCell initially configured in the connection establishment procedure after an initial security activation procedure is initiated.

If cross-carrier scheduling (or cross-CC scheduling) is applied, a PDCCH for DL allocation may be transmitted through DL CC#0 and a corresponding PDSCH may be transmitted through DL CC#2. For cross-CC scheduling, introduction of a Carrier Indicator Field (CIF) may be considered. Presence or absence of the CIF within the PDCCH may be configured semi-statically and UE-specifically (or UE group-specifically) through higher-layer signaling (e.g., RRC signaling). The baseline of PDCCH transmission is summarized below.

CIF disabled: PDCCH on a DL CC assigns PDSCH resources on the same DL CC or PUSCH resources on a single linked UL CC.

CIF enabled: PDCCH on a DL CC can assign PDSCH or PUSCH resources on a specific DL/UL CC of multiple aggregated DL/UL CCs using the CIF.

When a CIF is present, a BS may allocate a DL CC set for monitoring a PDCCH in order to lower blind decoding complexity of a UE. The PDCCH monitoring DL CC set may be a part of all aggregated DL CCs and include one or more DL CCs. The UE can detect/decode the PDCCH only in the corresponding DL CC set. That is, if the BS schedules the PDSCH/PUSCH to the UE, the BS can transmit the PDCCH only through the PDCCH monitoring DL CC. The PDCCH monitoring DL CC set may be configured UE-specifically, UE group-specifically, or cell-specifically. The term "PDCCH monitoring DL CC" may be replaced with equivalent terms such as monitoring carrier or monitoring cell. CC aggregated for the UE may be replaced with equivalent terms such as serving CC, serving carrier, or serving cell.

Figure 12:
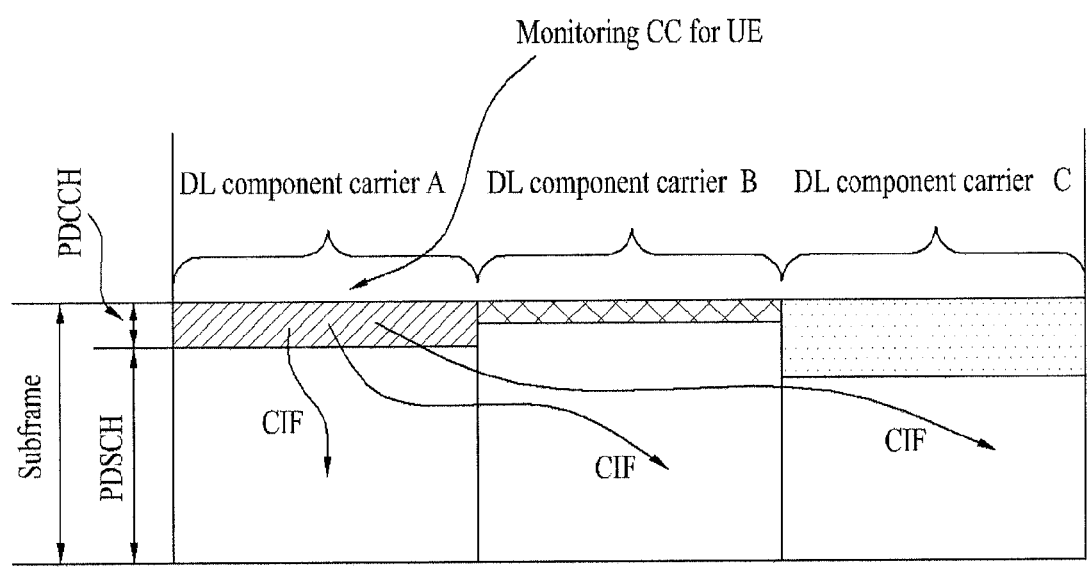
FIG. 12 illustrates cross-carrier scheduling.

FIG. 12 illustrates scheduling in the case where multiple carriers are aggregated. It is assumed that three DL CCs are aggregated and a DL CC A is configured as a PDCCH monitoring DL CC. DL CCs A, B, and C may be referred to as serving CCs, serving carriers, or serving cells. If a CIF is disabled, the DL CCs may transmit only PDCCHs for scheduling PDSCHs thereof without the CIF according to an LTE PDCCH rule. On the other hand, if the CIF is enabled by UE-specific (or UE group-specific or cell-specific) higher-layer signaling, the DL CC A (monitoring DL CC) may also transmit PDCCHs for scheduling PDSCHs of other CCs as well as a PDCCH for scheduling a PDSCH of the DL CC A, using the CIF. In this case, no PDCCH is transmitted in the DL CC B and DL CC C that are not configured as the PDCCH monitoring DL CC.

In an LTE-A system, it is considered that multiple ACK/NACK information/signals for multiple PDSCHs transmitted through multiple DL CCs be transmitted through a specific UL CC. To this end, as opposed to ACK/NACK transmission using PUCCH format 1a/1b in legacy LTE, it is considered to joint-code multiple ACK/NACK information (e.g. using a Reed-Muller code, Tail-biting convolutional code, etc.) and then to transmit multiple ACK/NACK information/signals using PUCCH format 2 or new PUCCH format (referred to as Enhanced PUCCH (E-PUCCH)). The E-PUCCH format includes a block-spreading based PUCCH format. ACK/NACK transmission using PUCCH format 2/E-PUCCH format after joint coding is exemplary and PUCCH format 2/E-PUCCH format may be used without restrictions on UCI transmission. For example, PUCCH format 2/E-PUCCH format may be used to transmit ACK/NACK, CSI (e.g. CQI, PMI, RI, PTI, etc.), SR, or two or more pieces of information thereof together. Accordingly, in this specification, PUCCH format 2/E-PUCCH format may be used to transmit a joint coded UCI codeword irrespective of the type/number/size of UCI.

Figure 13:
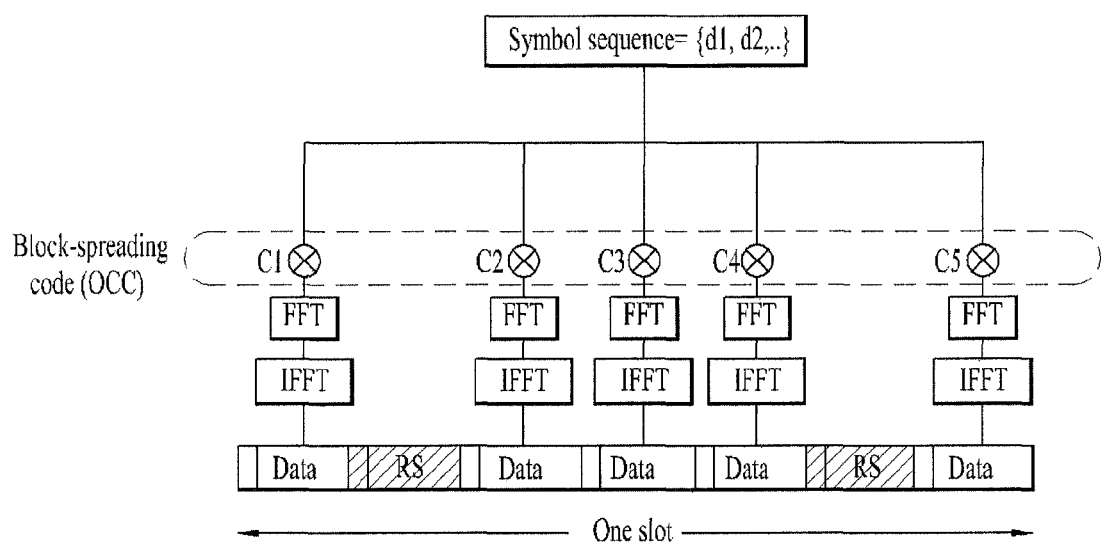
FIGS. 13 and 14 illustrate block-spreading based E-PUCCH formats.

FIG. 13 illustrates a block-spreading based E-PUCCH format in a slot level. In PUCCH format 2 of legacy LTE, one symbol sequence (d0~d4 in FIG. 6) is transmitted over the time domain and UE multiplexing is performed using CSs ($\alpha_{cs,x}$, where x is 0 to 4) of Constant-Amplitude Zero Auto-Correlation (CAZAC) sequence ($r_{u,0}$), as shown in FIG. 6. Meanwhile, in a block-spreading based E-PUCCH format, one symbol sequence is transmitted over the frequency domain and UE multiplexing is performed using Orthogonal Cover Code (OCC) based time-domain spreading. That is, the symbol sequence is spread in the time domain by the OCC and then transmitted. Control signals of multiple UEs can be multiplexed using the OCC.

Referring to FIG. 13, a length-5 (Spreading Factor (SF)=5) OCC is used to generate SC-FDMA symbols (i.e. UCI data parts) from one symbol sequence {d1, d2, . . . }. The symbol sequence {d1, d2, . . . } may mean a modulation symbol sequence or a codeword bit sequence. If the symbol sequence {d1, d2, . . . } means the bit sequence, the block diagram of FIG. 13 further includes a codeword modulation block. In FIG. 13, although a total of two RS symbols (i.e. RS parts) is used during one slot, various applications such as a scheme using UCI data parts configured using an OCC of SF=4 may be considered. Herein, the RS symbols may be generated from a CAZAC sequence having a specific cyclic shift. Moreover, the RS may be transmitted in a form in which a specific OCC is applied to (or multiplied by) multiple RS symbols of the time domain. Block-spread UCI is transmitted to a network through a Fast Fourier Transform (FFT) process and an Inverse Fast Fourier Transform (IFFT) process on an SC-FDMA symbol basis. Namely, the block-spreading scheme modulates control information (e.g. ACK/NACK etc.) using an SC-FDMA scheme unlike PUCCH format 1 or 2 series of legacy LTE.

Figure 14:
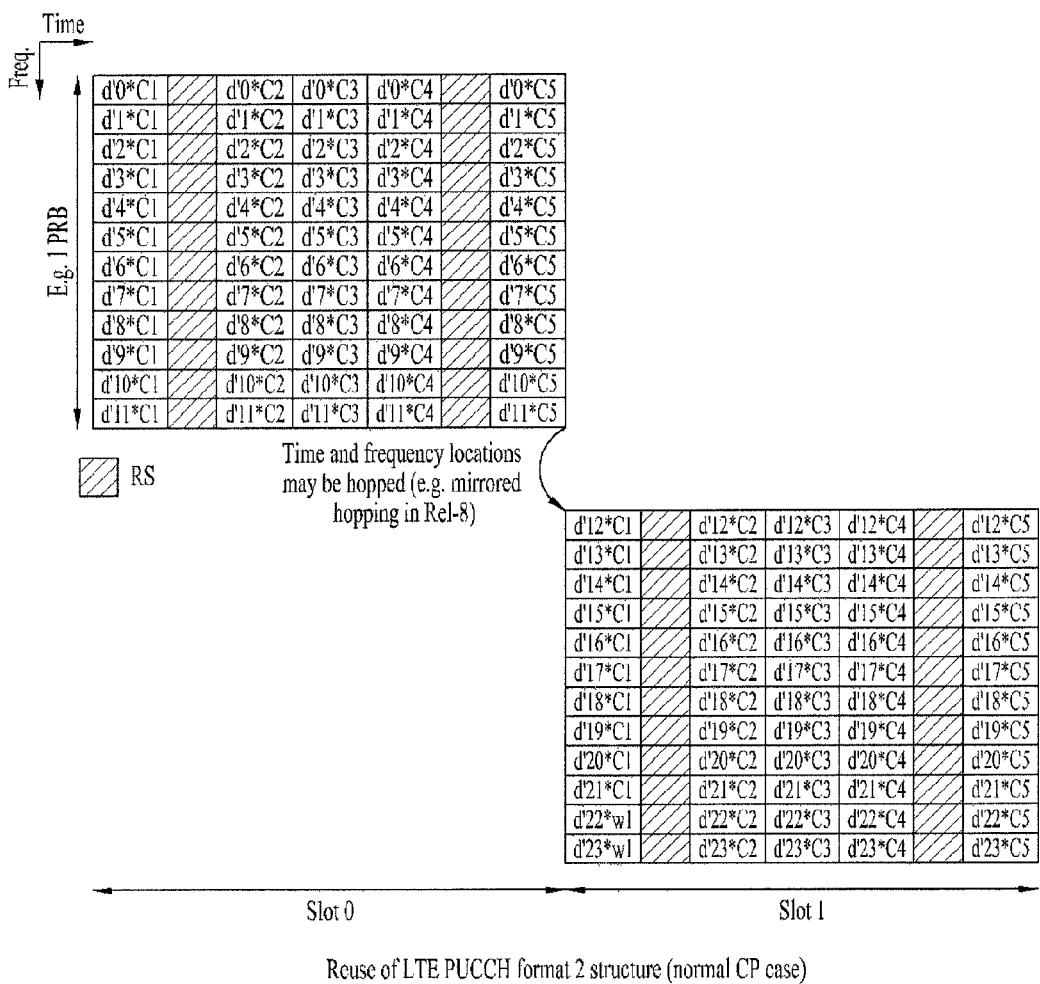

FIG. 14 illustrates a block-spreading based E-PUCCH format in a slot level.

Referring to FIG. 14, a symbol sequence {d'0~d'11} in slot 0 is mapped to subcarriers of one SC-FDMA symbol and mapped to 5 SC-FDMA symbols by block-spreading using OCCs C1 to C5. Similarly, a symbol sequence {d'12~d'23} in slot 1 is mapped to subcarriers of one SC-FDMA symbol and mapped to 5 SC-FDMA symbols by block-spreading using OCCs C1 to C5. Herein, the symbol sequence {d'0~d'11} or {d'12~d'23} in each slot shows a form in which FFT or FFT/IFFT is applied to the symbol sequence {d1, d2, . . . } of FIG. 13. If the symbol sequence {d'0~d'11} or {d'12~d'23} is a form in which FFT is applied to the symbol sequence {d1, d2, . . . } of FIG. 13, IFFT is additionally applied to the symbol sequence {d'0~d'11} or {d'12~d'23} to generate SC-FDMA symbols. The entire symbol sequence {d'0~d'23} is generated by joint coding one or more pieces of UCI. The front half {d'0~d'11} of the entire symbol sequence is transmitted through slot 0 and the rear half {d'12~d'23} of the entire symbol sequence is transmitted through slot 1. Although not shown, an OCC may vary on a slot basis and UCI data may be scrambled on an SC-FDMA symbol basis.

In the following description, a transmission scheme of channel coding based UCI (e.g. multiple ACK/NACK signals) using PUCCH format 2 or E-PUCCH format is referred to as a "multi-bit UCI coding" transmission scheme, for convenience of description. In the case of ACK/NACK for example, a multi-bit UCI coding transmission scheme indicates a method for joint-coding ACK/NACK information for PDSCHs (or PDCCHs in the Semi-Persistent Scheduling (SPS) release) of multiple DL cells or DTX information (representing that the PDCCHs are not received/detected) and transmitting the coded ACK/NACK block. For example, it is assumed that a UE operates in an SU-MIMO mode in a certain DL cell and receives two codewords. Then, a total of four feedback states of ACK/ACK, ACK/NACK, NACK/ACK, and NACK/NACK for a corresponding cell may be present or a maximum of five feedback states further including DTX may be present. If the UE receives a single codeword, a maximum of three states of ACK, NACK, and DTX may be present (if NACK and DTX are identically processed, a total of two states of ACK and NACK/DTX may be present). Accordingly, if the UE aggregates a maximum of 5 DL cells and operates in an SU-MIMO mode in all cells, a maximum of $5^5$ transmittable feedback states is present. Hence, the size of a necessary ACK.NACK payload is at least 12 bits. If DTX and NACK are identically processed, the number of feedback states is $4^5$ and the size of a necessary ACK/NACK payload is at least 10 bits.

The present invention proposes a UCI multiplexing method and a UE operation during application of a multi-bit UCI coding scheme using the E-PUCCH format for UCI transmission for multiple cells. Specifically, the present invention proposes a UCI multiplexing method and a UE operation while using the E-PUCCH format for transmission of multiple ACK/NACK signals for multiple cells. In addition, the present invention proposes a method for multiplexing or identifying multi-bit ACK/NACK information and CQI (and/or SR) information transmitted through the same subframe. The proposed method can be classified according to types/relationship of a PUCCH resource for ACK/NACK (i.e. A/N) transmission and a PUCCH resource for CQI (and/or SR) transmission as follows.

Method 1: ACK/NACK and CSI with Different E-PUCCH Format Resources

This method uses different E-PUCCH format resources for A/N transmission and CSI transmission. CSI includes CQI, PMI, RI, PTI, etc. for DL. Configuration for CSI transmission is performed on a cell basis and CSI is also generated on a cell basis.

For convenience, a resource for E-PUCCH$_{A/N}$ is referred to as $n_{PUCCH(A/N)}^{(e)}$ and a resource for E-PUCCH$_{CSI}$ is referred to as $n_{PUCCH(CSI)}^{(e)}$. This method is applied when $n_{PUCCH(A/n)}^{(e)} \neq n_{PUCCH(CSI)}^{(e)}$. $n_{PUCCH}^{(e)}$ denotes a representative value for an E-PUCCH format resource, and a Physical Resource Block (PRB) index and an OCC index are induced from $n_{PUCCH}^{(e)}$. Accordingly, E-PUCCH$_{A/N}$ and E-PUCCH$_{CSI}$ are transmitted through different PRBs or may have UCI data parts having different OCCs. An RS resource for an E-PUCCH may be configured by (PRB index, CS index) or may be configured by (PRB index, CS index, OCC index). A PRB for an RS is given by the same PRB as a corresponding E-PUCCH and a CS index and/or OCC index for an RS may be derived from a corresponding E-PUCCH resource index $n_{PUCCH}^{(e)}$. Accordingly, RSs for E-PUCCH$_{A/N}$ and E-PUCCH$_{CSI}$ may be transmitted through different PRBs or may have different CSs and/or OCCs.

$n_{PUCCH(A/N)}^{(e)}$ and $n_{PUCCH(CSI)}^{(e)}$ may be explicitly or implicitly signaled. To this end, a candidate set of $n_{PUCCH(A/N)}^{(e)}$ and $n_{PUCCH(CSI)}^{(e)}$ is provided by higher-layer signaling (e.g. RRC signaling) and an E-PUCCH resource for actual transmission may be explicitly or implicitly signaled. For example, a candidate set of $n_{PUCCH}^{(e)}$ may be provided through RRC signaling and $n_{PUCCH}^{(e)}$ for actual transmission may be indicated through a Transmit Power Control (TPC) field of an SCell PDCCH.

A UE operation according to the present method in a CSI transmission subframe may be defined as follows. In this specification, the CSI transmission subframe refers to a subframe requiring CSI transmission (i.e. a subframe where a CSI transmission event occurs) according to CSI configuration information (e.g. cycle, offset, etc.).

If A/N information is not present, only CSI is transmitted through E-PUCCH$_{CSI}$($n_{PUCCH(CSI)}^{(e)}$)

If A/N information is present,
Scheme 1) only A/N is transmitted through E-PUCCH$_{A/N}$ ($n_{PUCCH(A/N)}^{(e)}$) (i.e. CSI is dropped), and Scheme 2) A/N and CSI are joint-coded and then transmitted through E-PUCCH$_{A/N}$($n_{PUCCH(A/N)}^{(e)}$).

Figure 15:
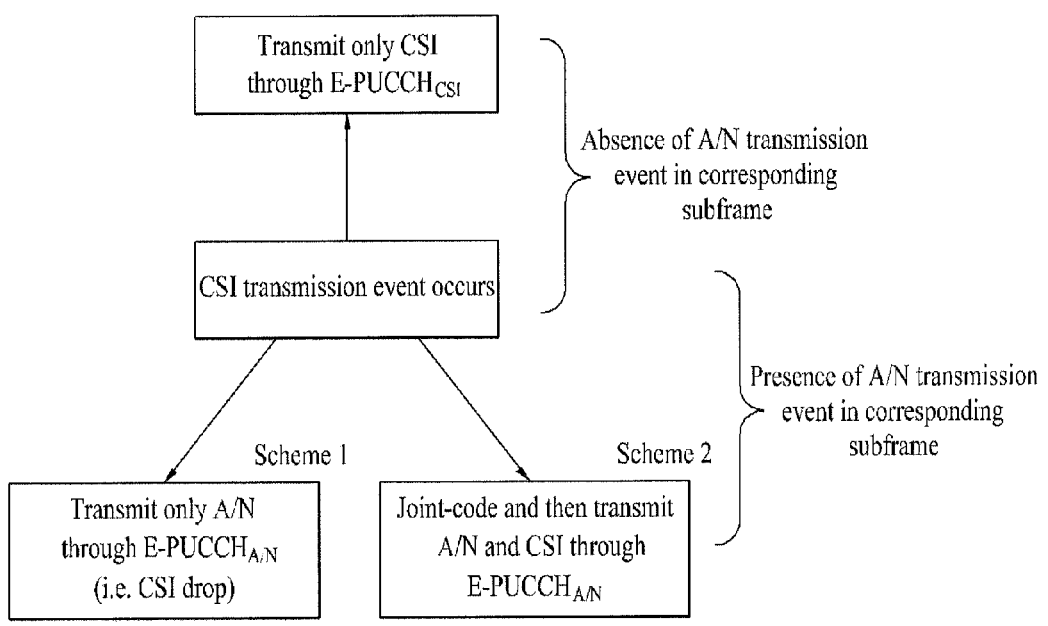
FIGS. 15 to 20 illustrate UCI multiplexing schemes according to an exemplary embodiment of the present invention.

The above schemes are shown in FIG. 15. According to the above-described schemes, if an A/N transmission event and a CSI transmission event occur in the same subframe, single-carrier characteristics can be maintained because only one E-PUCCH is transmitted. In addition, UCI detection/decoding efficiency in a receiver can be raised by differently configuring the E-PDCCH resources for UCI transmission according to the presence/absence of A/N information.

Additionally, use of different E-PUCCH format resources for A/N transmission and CSI/SR transmission may be considered. For convenience, a resource for E-PUCCH$_{A/N}$ is referred to as $n_{PUCCH(A/N)}^{(e)}$ and a resource for E-PUCCH$_{CSI/SR}$ is referred to as $n_{PUCCH(CSI/SR)}^{(e)}$. Namely, the present method is applied when $n_{PUCCH(A/N)}^{(e)} \neq n_{PUCCH(CSI/SR)}^{(e)}$. CSI and SR may share one or more E-PDCCH resources having the same UCI data/RS part. First, a UE operation according to the present method in a CSI transmission subframe may be defined as follows.

In the case of the absence of A/N information, only CSI is transmitted through E-PUCCH$_{CSI/SR}$ ($n_{PUCCH(CSI/SR)}^{(e)}$).

In the case of the presence of A/N information,
Scheme 1) only A/N is transmitted through E-PUCHAN$_{A/N}$($n_{PUCCH(A/N)}^{(e)}$) (i.e. CSI is dropped), and Scheme 2) A/N and CSI are joint-coded and then transmitted through E-PUCCH$_{A/N}$($n_{PUCCH(A/N)}^{(e)}$).

Operation in the CSI transmission subframe is as described earlier (refer to FIG. 15). Next, a UE operation in an SR transmission subframe may be defined as follows.

The SR transmission subframe refers to a subframe in which SR transmission is permitted according to SR configuration information (e.g. cycle, offset, etc.).

In the case of a negative SR, A/N information is transmitted through E-PUCCH$_{A/N}$($n_{PUCCH(A/N)}^{(e)}$).

In the case of a positive SR, A/N information is transmitted through E-PUCCH$_{CSI/SR}$($n_{PUCCH(CSI/SR)}^{(e)}$).

One-bit information may be explicitly transmitted for a negative/positive SR. In this case, an SR bit and A/N information are joint-coded. Specifically, one-bit SR information (e.g. 1 for a positive SR and 0 for a negative SR) may be added to the beginning or end of an A/N payload and then joint-coded (e.g. FIG. 8). Moreover, the negative/positive SR may be transmitted using an OOK scheme as in legacy LTE and may be indirectly signaled through an E-PUCCH resource in which A/N information is transmitted.

Meanwhile, if the SR transmission subframe is equal to the CSI transmission subframe, CSI is not transmitted in the corresponding subframe (i.e. CSI is dropped) and a UE operation in the above-described SR transmission subframe may be applied. If the SR transmission subframe and CSI transmission subframe collide, CSI drop may be limited to the case in which SR is a positive SR.

Figure 16:
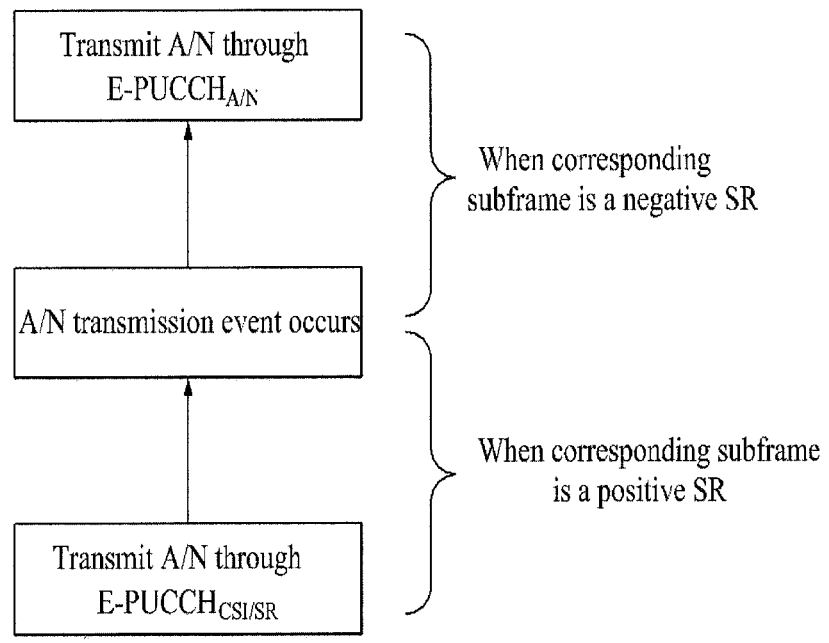

The above-described schemes based on the SR are shown in FIG. 16. According to the above-described schemes, when an A/N transmission event and a CSI transmission event occur in the same subframe, single-carrier characteristics can be maintained because only one E-PUCCH is transmitted. In addition, UCI detection/decoding efficiency can be raised by configuring different E-PDCCH resources for UCI transmission according to the presence/absence of A/N information/SR.

Method 2: ACK/NACK and CSI with the Same E-PUCCH Format Resource.

This method shares one or more E-PDCCH format resources for A/N transmission and CSI transmission. If a resource for E-PUCCH$_{A/N}$ is referred to as $n_{PUCCH\,(A/N)}^{(e)}$ and a resource for E-PUCCH$_{CSI}$ is referred to as $n_{PUCCH(CSI)}^{(e)}$, the present method is applied when $n_{PUCCH(A/N)}^{(e)} = n_{PUCCH(CSI)}^{(e)} = \{n_{PUCCH,i}^{(e)}\}$. Namely, E-PUCCH$_{A/N}$ and E-PUCCh$_{CSI}$ may have a UCI data part having the same PRB/OCC. i=0, . . . , N−1 and N is an integer equal to or greater than 0. $\{n_{PUCCH,i}^{(e)}\}$ may be given as described in Method 1. Accordingly, a BS should attempt to detect UCI with respect to $\{n_{PUCCH,i}^{(e)}\}$ or a specific R-PDCCH resource in order to receive A/N or CSI. The BS cannot be aware of whether received UCI is A/N or CSI through a detected E-PUCCH. To solve this problem, different RSs (RS$_{A/N}$ and RS$_{CSI}$) may be used according to transmitted UCI while a corresponding E-PUCCH resource is transmitted. Then, it can be discerned whether information transmitted through the E-PUCCH resource is A/N or CSI, by using different RSs in accordance with UCI. Herein, (RS$_{A/N}$, RS$_{CSI}$) may be RSs having different CSs, different OCCs, or a combination of different CSs or OCCs. Moreover, (RS$_{A/N}$, RS$_{CSI}$) may be RSs having the same CS and different OCCs. A UE operation according to the present method in the CSI transmission subframe may be defined as follows.

If A/N information is not present, only CSI is transmitted using RS$_{CSI}$

If A/N information is present,

Scheme 1) only A/N is transmitted using RS$_{A/N}$ (i.e. CSI is dropped), and

Scheme 2) A/N and CSI are joint-coded and then transmitted using RS$_{A/N}$.

Figure 17:
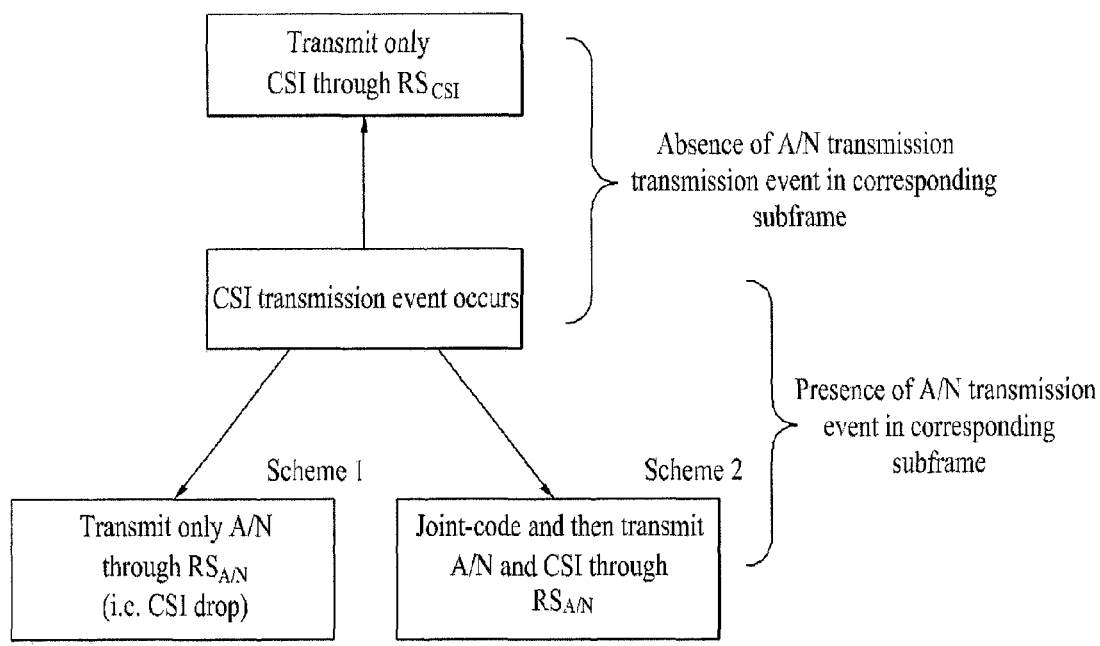

The above schemes are shown in FIG. 17. According to the above-described schemes, if an A/N transmission event and a CSI transmission event occur in the same subframe, single-carrier characteristics can be maintained because only one E-PUCCH is transmitted. In addition, UCI detection/decoding efficiency in a receiver can be raised by configuring different RS resources for decoding an E-PUCCH signal according to the presence/absence of A/N information. Resource waste can be prevented and resources can be efficiently managed by sharing one or more E-PUCCH format resources for A/N transmission and CSI transmission.

Additionally, one or more E-PUCCH format resources for A/N transmission and CSI/SR transmission may be shared. If a resource for E-PUCCH$_{A/N}$ is referred to as $n_{PUCCH\,(A/N)}^{(e)}$ and a resource for E-PUCCH$_{CSI/SR}$ is referred to as $n_{PUCCH,i}^{(e)}$, the present method is given as the case where $n_{PUCCH(A/N)}^{(e)} = n_{PUCCH(CSI/SR)}^{(e)} = \{n_{PUCCH,i}^{(e)}\}$. That is, E-PUCCH$_{A/N}$ and E-PUCCH$_{CSI/SR}$ may have a UCI data part with the same PRB/OCC. i=0, . . . , N−1 and N is an integer equal to or greater than 0. To perform A/N transmission and CSI/SR transmission through E-PUCCH resources having a UCI data part of the same OCC, different RSs (RS$_{A/N}$, RS$_{CSI/SR}$) may be used based on UCI of the E-PUCCH. Herein, (RS$_{A/N}$, RS$_{CSI/SR}$) may be RSs having different CSs, different OCCs, or a combination of different CSs or OCCs. Moreover, (RS$_{A/N}$, RS$_{CSI/SR}$) may be RSs having the same CS and different OCCs. In this example, CSI and SR share one E-PUCCH resource having the same UCI data part/RS part. A UE operation according to the present method in the CSI transmission subframe may be defined as follows.

If A/N information is not present, only CSI is transmitted through RS$_{CSI/SR}$.

If A/N information is present,

Scheme 1) only A/N is transmitted using RS$_{A/N}$ (i.e. CSI is dropped), and

Scheme 2) A/N and CSI are joint-coded and then transmitted using RS$_{A/N}$.

Operation in the CSI transmission subframe is as described earlier (refer to FIG. 17).

Next, a UE operation in the SR transmission subframe may be defined as follows.

In the case of a negative SR, A/N information is transmitted through RS$_{A/N}$.

In the case of a positive SR, A/N information is transmitted through RS$_{CSI/SR}$.

One-bit information may be explicitly transmitted for a negative/positive SR. In this case, an SR bit and A/N information are joint-coded. Specifically, one-bit SR information (e.g. 1 for a positive SR and 0 for a negative SR) may be added to the beginning or end of an A/N payload and then joint-coded (e.g. FIG. 8). Moreover, a negative/positive SR may be transmitted using an OOK scheme as in legacy LTE and may be indirectly signaled through an E-PUCCH resource in which A/N information is transmitted.

Meanwhile, if the SR transmission subframe is equal to the CSI transmission subframe, CSI is not transmitted in the corresponding subframe (i.e. CSI is dropped) and the UE operation in the above-described SR transmission subframe may be applied.

Figure 18:
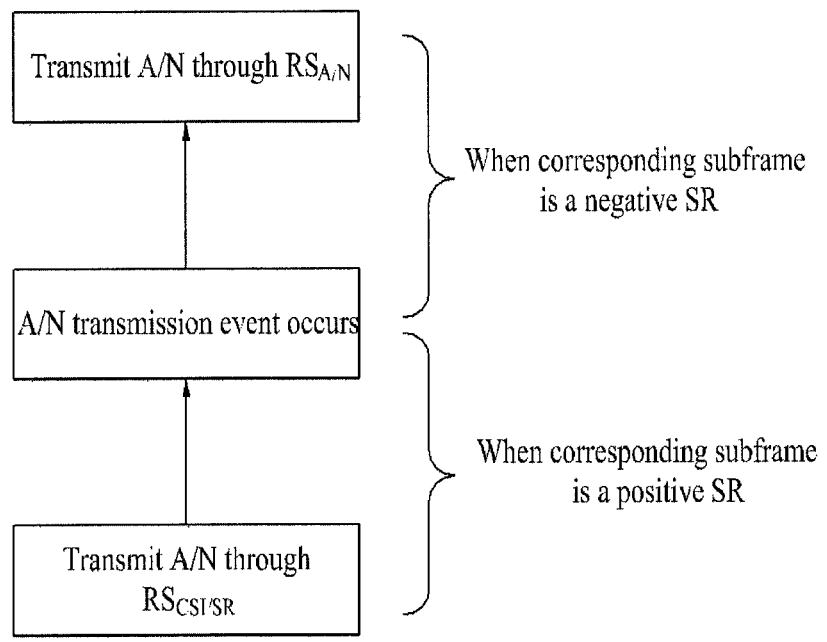

The above-described schemes based on an SR are shown in FIG. 18. According to the above-described schemes, if the A/N transmission event and the CSI transmission event occur in the same subframe, single-carrier characteristics can be maintained because only one E-PUCCH is transmitted. Further, UCI detection/decoding efficiency in a receiver can be raised by configuring different RS resources for demodulation of the E-PDCCH signal according to the presence/absence of A/N information. In addition, resources waste can be prevented and resources can be efficiently managed by sharing one or more E-PUCCH format resources for A/N transmission and CSI (CSI/SR) transmission.

Method 3: Use of E-PUCCH Format for ACK/NACK and Use of PUCCH Format 2 for CSI

This method uses an E-PUCCH format resource for A/N transmission and uses a PUCCH format 2 (i.e. PUCCH-2) resource (FIG. 6, $n_{PUCCH}^{(2)}$) for CSI transmission as in legacy LTE. A UE operation according to the present method in the CSI transmission subframe may be defined as follows.

If A/N information is not present, only CSI is transmitted through a PUCCH-2 resource $n_{PUCCH}^{(2)}$.

If A/N information is present,

Scheme 1) only A/N is transmitted through the E-PUCCH resource (i.e. CSI is dropped), and Scheme 2) A/N and CSI are joint-coded and then transmitted through the E-PUCCH resource.

Figure 19:
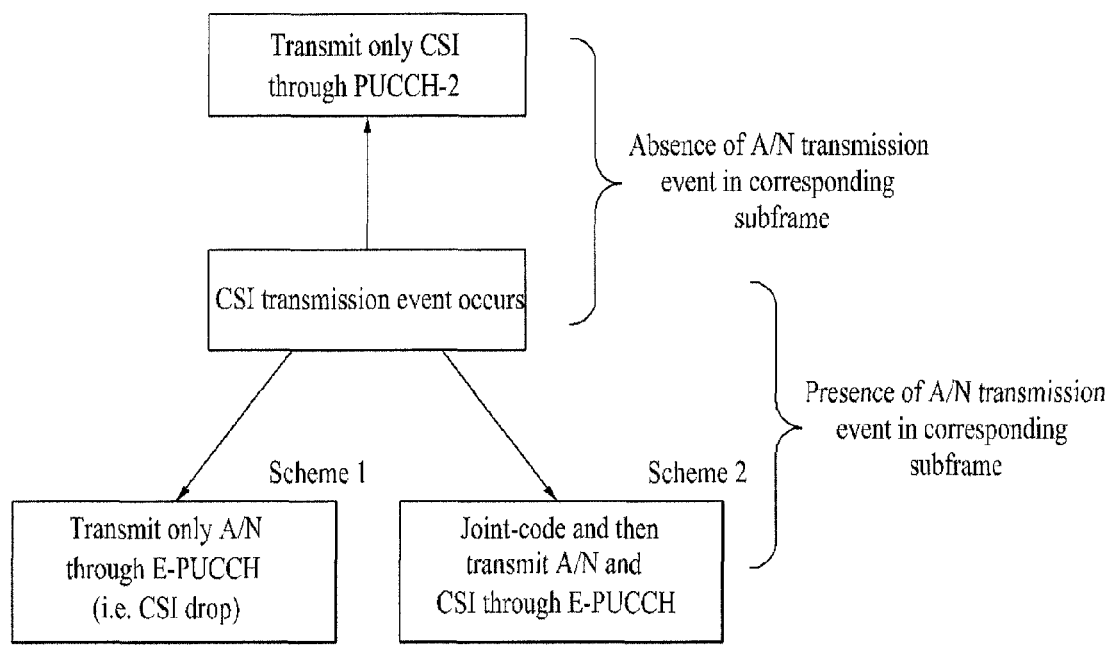

The above schemes are shown in FIG. 19. According to the above-described schemes, if the A/N transmission event and the CSI transmission event occur in the same subframe, single-carrier characteristics can be maintained because only one PUCCH is transmitted. In addition, UCI detection/decoding efficiency can be raised by configuring different PUCCH formats for UCI transmission according to the presence/absence of A/N information.

Additionally, one or more E-PUCCH format resources may be shared for A/N transmission and SR transmission. If a resource for E-PUCCH$_{A/N}$ is referred to as $n_{PUCCH(A/N)}^{(e)}$ and a resource for E-PUCCH$_{SR}$ is referred to as $n_{PUCCH(SR)}^{(e)}$, the present method is given as the case where $n_{PUCCH(A/N)}^{(e)} = n_{PUCCH(SR)}^{(e)} = \{n_{PUCCH,i}^{(e)}\}$. That is, E-PUCCH$_{A/N}$ and E-PUCCH$_{SR}$ may have a UCI data part having the same PRB/OCC. i=0, . . . , N−1 and N is an integer equal to or greater than 0. To perform A/N transmission and SR transmission through an E-PUCCH resource having a UCI data part of the same OCC, different RSs (RS$_{A/N}$, RS$_{SR}$) may be used based on UCI of the E-PUCCH. Herein, $RS_{A/N}$ and $RS_{SR}$ may be RSs having different CSs, different OCCs, or a combination of different CSs or OCCs. Alternatively, $RS_{A/N}$ and $RS_{SR}$ may be RSs having the same CS and different OCCs. A UE operation according to the present method in the CSI transmission subframe may be defined as follows.

If A/N information is not present, only CSI is transmitted through a PUCCH format-2 resource.

If A/N information is present,

Scheme 1) only A/N is transmitted through the E-PUCCH resource using $RS_{A/N}$ (i.e. CSI is dropped), and Scheme 2) A/N and CSI are joint-coded and then transmitted through the E-PUCCH resource using $RS_{A/N}$.

Operation in the CSI transmission subframe is as described earlier (refer to FIG. 19). Next, a UE operation in the SR transmission subframe may be defined as follows.

In the case of a negative SR, A/N information is transmitted through the E-PUCCH resource using $RS_{A/N}$.

In the case of a positive SR, A/N information is transmitted through the E-PUCCH resource using $RS_{SR}$.

One-bit information may be explicitly transmitted for a negative/positive SR. In this case, an SR bit and A/N information are joint-coded. Specifically, one-bit SR information (e.g. 1 for a positive SR and 0 for a negative SR) may be added to the beginning or end of an A/N payload and then joint-coded (e.g. FIG. 8). Moreover, negative/positive SR may be transmitted using an OOK scheme as in legacy LTE and may be indirectly signaled through an E-PUCCH resource in which A/N information is transmitted.

Meanwhile, if the SR transmission subframe is equal to the CSI transmission subframe, CSI is not transmitted in the corresponding subframe (i.e. CSI is dropped) and the UE operation in the above-described SR transmission subframe may be applied.

Figure 20:
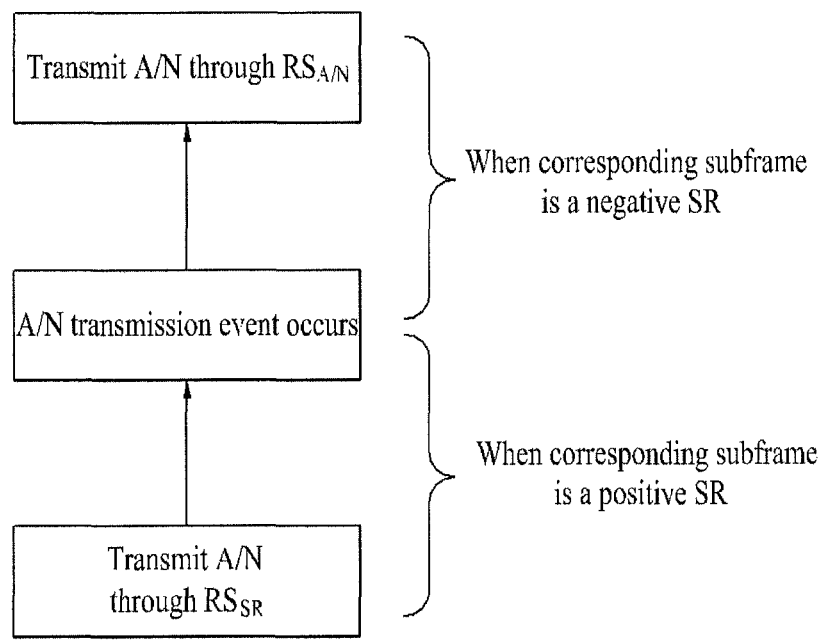

The above-described schemes based on an SR are shown in FIG. 20. According to the above-described schemes, if an A/N transmission event and a CSI transmission event occur in the same subframe, single-carrier characteristics can be maintained because only one PUCCH is transmitted. Further, UCI detection/decoding efficiency in a receiver can be raised by configuring different PUCCH formats for UCI transmission or different RS resources for demodulation of the PDCCH signal in consideration of UCI requiring transmission in the same subframe. In addition, resources waste can be prevented and resources can be efficiently managed by sharing one or more E-PUCCH format resources for A/N transmission and SR transmission.

Figure 21:
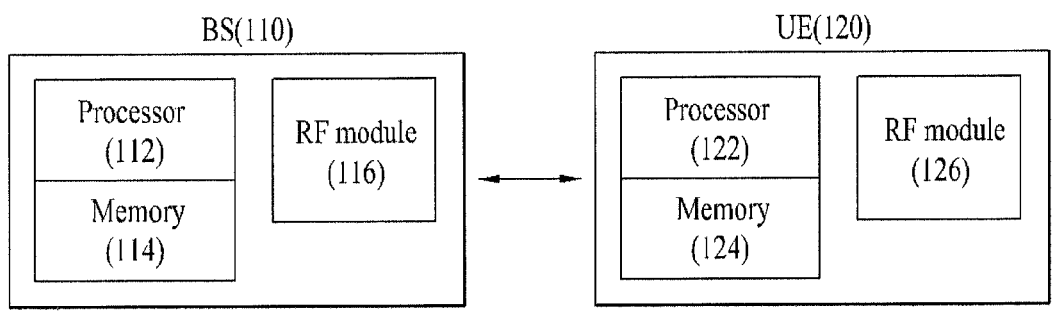
FIG. 21 illustrates a BS and a UE which are applicable to an exemplary embodiment of the present invention.

FIG. 21 illustrates a BS and a UE which are applicable to an exemplary embodiment of the present invention. If a radio communication system includes a relay, communication over a backhaul link is performed between the BS and the relay and communication over an access link is performed between the relay and the UE. Accordingly, the BS and UE shown in FIG. 21 may be replaced with the relay according to circumstance.

Referring to FIG. 21, a radio communication system includes a BS 110 and a UE 120. The BS 110 includes a processor 112, a memory 114, and a Radio Frequency (RF) unit 116. The processor 112 may be configured to implement the procedures and/or methods proposed in the present invention. The memory 114 is connected to the processor 112 and stores information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed in the present invention. The memory 124 is connected to the processor 122 and stores information related to operation of the processor 122. The RF unit 126 is connected to the processor 122 and transmits and/or receives radio signals. The BS 110 and/or the UE 120 may have a single antenna or multiple antennas.

The above-described embodiments are combinations of constituent elements and features of the present invention in a predetermined form. The constituent elements or features should be considered selectively unless otherwise mentioned. Each constituent element or feature may be practiced without being combined with other constituent elements or features. Further, the embodiments of the present invention may be constructed by combining partial constituent elements and/or partial features. Operation orders described in the embodiments of the present invention may be rearranged. Some constructions or features of any one embodiment may be included in another embodiment or may be replaced with corresponding constructions or features of another embodiment. It is apparent that the embodiments may be constructed by a combination of claims which do not have an explicitly cited relationship in the appended claims or may include new claims by amendment after application.

In the present document, a description has been made of a data transmission and reception relationship between a UE and a BS. Here, a specific operation described as being performed by the BS may be performed by an upper node of the BS. Namely, it is apparent that, in a network comprised of a plurality of network nodes including the BS, various operations performed for communication with the UE may be performed by the BS, or network nodes other than the BS. The term BS may be replaced with the term fixed station, Node B, eNode B (eNB), access point, etc. The term UE may be replaced with the term Mobile Station (MS), Mobile Subscriber Station (MSS), etc.

The embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be used for a wireless communication device such as a UE, a relay, and a BS.

The invention claimed is:

1. A method for transmitting Uplink Control Information (UCI) in a situation in which a plurality of cells is configured in a wireless communication system, the method comprising:

generating UCI; and determining a Physical Uplink Control Channel (PUCCH) resource for transmitting the UCI, wherein, if reception response information and channel state information are triggered in the same subframe, only first UCI generated from the reception response information is transmitted through a first PUCCH, and if the reception response information and scheduling request information are triggered in the same subframe, second UCI generated by joint coding the reception response information and the scheduling request information is transmitted through a second PUCCH, wherein UCI data part for the first PUCCH and UCI data part for the second PUCCH have same Physical Resource Blocks (PRBs) and a Orthogonal Cover Code (OCC), and wherein at least one of Cyclic Shift (CS), OCC or combination of CS and OCC of a reference signal for the first PUCCH is different from that of a reference signal for the second PUCCH.

2. The method of claim 1, wherein a resource used to transmit the reference signal includes at least one of a Physical Resource Block (PRB), a Cyclic Shift (CS) applied to a reference signal sequence, and an orthogonal code applied to a plurality of Single Carrier Frequency Division Multiple Access (SC-FDMA) symbols in a time domain.

3. The method of claim 2, wherein the orthogonal code applied to the plurality of SC-FDMA symbols in the time domain is provided in consideration of the UCI transmitted on the PUCCH.

4. The method of claim 2, wherein the resource used to transmit the reference signal for demodulation of the first PUCCH corresponds to the reception response information and the resource used to transmit the reference signal for demodulation of the second PUCCH corresponds to the scheduling request information.

5. The method of claim 1, wherein the reception response information includes Acknowledgement/Negative (ACK/NACK) responses to Physical Downlink Shared Channels (PDSCHs) of a plurality of cells.

6. The method of claim 1, wherein the channel state information includes at least one of a Channel Quality Indicator (CQI), a Precoding Matrix Indicator (PMI), a Rank Indicator (RI), and a Precoding Type Indicator (PTI).

7. A communication apparatus for transmitting Uplink Control Information (UCI) in a situation in which a plurality of cells is configured in a wireless communication system, the communication apparatus comprising:

a Radio Frequency (RF) unit; and a processor, configured to:

generate UCI, and determine a Physical Uplink Control Channel (PUCCH) resource for transmitting the UCI, wherein, if reception response information and channel state information are triggered in the same subframe, only first UCI generated from the reception response information is transmitted through a first PUCCH and, if the reception response information and scheduling request information are triggered in the same subframe, second UCI generated by joint coding the reception response information and the scheduling request information is transmitted through a second PUCCH, wherein UCI data part for the first PUCCH and UCI data part for the second PUCCH have same Physical Resource Blocks (PRBs) and a Orthogonal Cover Code (OCC), and wherein at least one of Cyclic Shift (CS), OCC or combination of CS and OCC of a reference signal for the first PUCCH is different from that of a reference signal for the second PUCCH.

8. The communication apparatus of claim 7, wherein a resource used to transmit the reference signal includes at least one of a Physical Resource Block (PRB), a Cyclic Shift (CS) applied to a reference signal sequence, and an orthogonal code applied to a plurality of Single Carrier Frequency Division Multiple Access (SC-FDMA) symbols in a time domain.

9. The communication apparatus of claim 8, wherein the orthogonal code applied to the plurality of SC-FDMA symbols in the time domain is provided in consideration of the UCI transmitted on the PUCCH.

10. The communication apparatus of claim 8, wherein the resource used to transmit the reference signal for demodulation of the first PUCCH corresponds to the reception response information and the resource used to transmit the reference signal for demodulation of the second PUCCH corresponds to the scheduling request information.

11. The communication apparatus of claim 7, wherein the reception response information includes Acknowledgement/Negative (ACK/NACK) responses to Physical Downlink Shared Channels (PDSCHs) of a plurality of cells.

12. The communication apparatus of claim 7, wherein the channel state information includes at least one of a Channel Quality Indicator (CQI), a Precoding Matrix Indicator (PMI), a Rank Indicator (RI), and a Precoding Type Indicator (PTI).

* * * * *